United States Patent [19]
Eilert et al.

[11] Patent Number: 5,247,687
[45] Date of Patent: Sep. 21, 1993

[54] METHOD AND APPARATUS FOR DETERMINING AND USING PROGRAM PAGING CHARACTERISTICS TO OPTIMIZE SYSTEM PRODUCTIVE CPU TIME

[75] Inventors: Catherine K. Eilert, Wappingers Falls; Bernard R. Pierce, Poughkeepsie, both of N.Y.

[73] Assignee: International Business Machines Corp., Armonk, N.Y.

[21] Appl. No.: 576,539

[22] Filed: Aug. 31, 1990

[51] Int. Cl.5 .......................................... G06F 11/34
[52] U.S. Cl. .............................. 395/775; 364/DIG. 1; 364/264; 364/264.1; 364/264.4; 364/280; 364/280.5
[58] Field of Search ................ 395/700, 775, 425, 575

[56] References Cited

U.S. PATENT DOCUMENTS 4,047,243 9/1977 Dijkstra .
4,989,134 1/1991 Shaw .................................. 395/425

FOREIGN PATENT DOCUMENTS 0203601 12/1986 European Pat. Off. .
0362880 4/1990 European Pat. Off. .

OTHER PUBLICATIONS

Tetzlaff et al, "A Page Swapping Prototype for VM/HPO" pp. 215-230; IBM Systems Journal 26 (1987) #2.
Opderbeck et al., "Performing of the Page Fault Frequency Replacement Algorithm in MP Environment" pp. 235-241 Information Processing 74-Aug. 1974.

*Primary Examiner*—Debra A. Chun
*Attorney, Agent, or Firm*—William B. Porter

[57] ABSTRACT

Paging data is used to manage address space working set size, system multiprogramming level, and job mix, to improve system productive CPU utilization. System paging characteristics are monitored to determine when to perform management functions. When needed, address space paging data is collected for monitored address spaces, and target working set sizes set for managed address spaces. If necessary, address spaces are "forced" to exhibit characteristic paging patterns. Reallocation of working set pages among active address spaces, and swap in-swap out actions, are assessed, and impacts on productive CPU utilization is estimated.

23 Claims, 18 Drawing Sheets

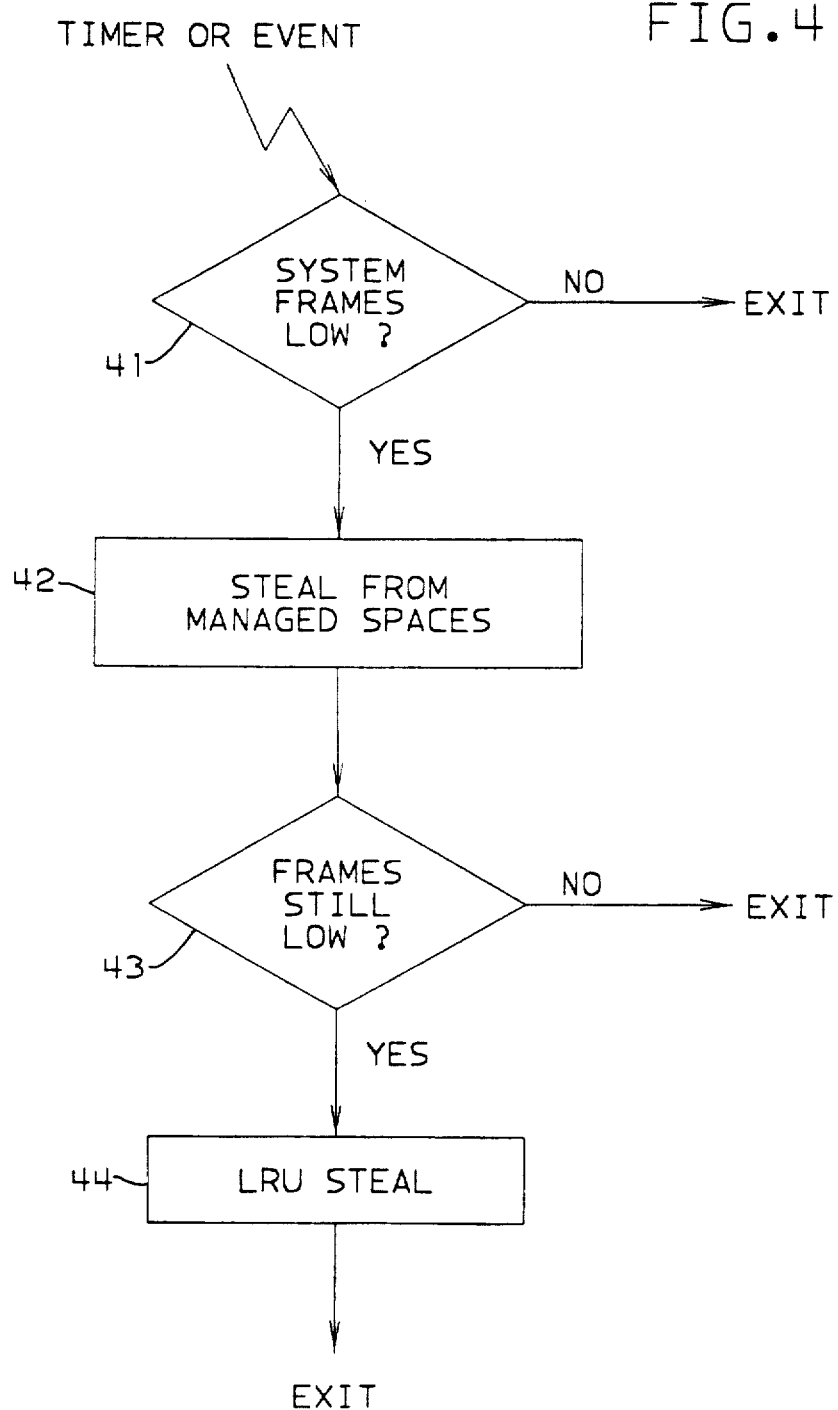

FIG. 16  ADDRESS SPACE PAGING COST RATE
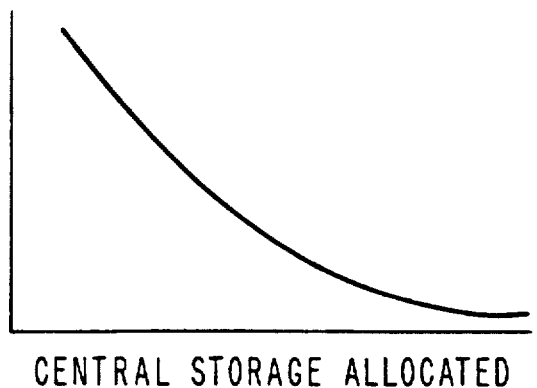
PAGING COST / RESIDENT SECOND
CENTRAL STORAGE ALLOCATED
FIG. 17  ADDRESS SPACE PRODUCTIVE CPU RATE
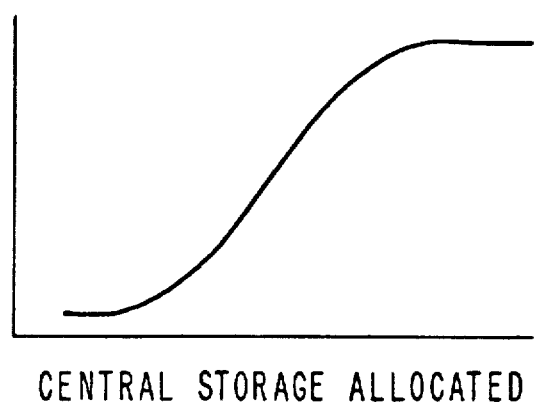
PRODUCTIVE CPU / RESIDENT SECOND
CENTRAL STORAGE ALLOCATED
FIG. 18  SYSTEM PAGING AND SWAP COST RATE
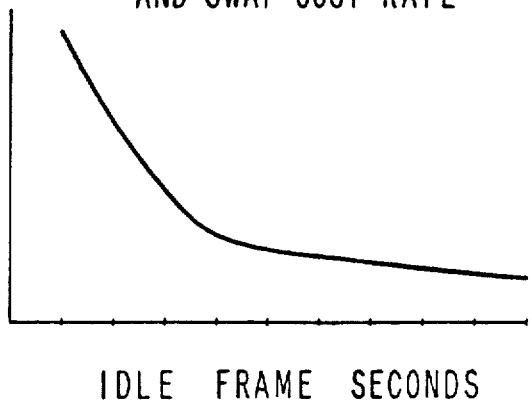
COST / PROCESSOR ELAPSED SECOND
IDLE FRAME SECONDS

METHOD AND APPARATUS FOR DETERMINING AND USING PROGRAM PAGING CHARACTERISTICS TO OPTIMIZE SYSTEM PRODUCTIVE CPU TIME

BACKGROUND OF THE INVENTION

1. Field of the Invention

The present invention relates to operating systems for computers and computer complexes. More particularly, it describes a mechanism and process for managing the working set sizes of programs executing within a virtual memory computer complex managed by an operating system.

2. Background Art

In typical virtual memory-oriented computer complexes, many programs execute concurrently and compete for system resources including processor storage. An operating system, such as IBM's MVS/ESA, allocates resources, including processor storage (which includes central storage and expanded storage), to the programs. In so doing, the operating system "swaps" programs in and out of central storage—so that programs not currently executing (e.g.,—suspended awaiting terminal user interaction) are not unnecessarily depriving active programs of limited central storage resources. In addition, the operating system may "steal" central storage pages from swapped-in programs, which frees them up for later reallocation. The stealing of a page is helpful if the page is not soon re-referenced, but is damaging if the program from which it is stolen immediately re-references it; in this latter case it must be "demand-paged" in from expanded storage or auxiliary storage, and the stealing was in vain. An algorithm in wide use for such page-stealing is "global LRU"—or "global least-recently-used". Using this page stealing algorithm, usage characteristics of all central storage pages are maintained; a page is "stolen" from expanded or an active (swapped-in) program if it has not been referenced "recently"—when compared with the page referencing characteristics of other system pages. The theory behind such a global LRU policy is that the pages most recently referenced by a program are those most likely to be referenced in the near future—so, in general, "old" pages should be stolen first. It is recognized that such policies may not be helpful for programs with "unusual" referencing patterns—for example, programs sequentially referencing in-storage data will not be helped by LRU stealing.

A concept that has proven useful in handling central storage management in such systems is that of a program's "working set". As commonly used, a program's working set is the set of distinct pages that it references during some time interval T. Depending on the time interval chosen, a page once part of a program's working set may subsequently fall outside that set-in which case it may be treated differently from working set pages (for example—it may be stolen; it may not be swapped-in when the associated program is swapped in; etc.).

Practical difficulties arise in the implementation of a working set-based storage management policy in a complex large system environment such as the aforementioned MVS/ESA. For example, page stealing using a system-wide policy such as global LRU may not be sufficiently sensitive to individual program idiosyncrasies; a stealing scheme tailored to individual programs may be wasteful of processing resource when central storage is not in heavy demand (i.e., when there are a good deal of "discretionary" page frames—whose stealing would not adversely affect program performance, assuming such "discretionary" frames could be easily identified); viewing program working sets from the standpoint of a sliding window (i.e., over a time interval T) will not deal well with programs that periodically revert to "old habits"—i.e., "old" performance characteristics are lost, and so are unavailable for use in making new swap/steal decisions; LRU-based stealing may not be appropriate for programs with a tendency to utilize extremely large amounts of central storage; and common working set management techniques may not have a beneficial effect on productive system usage since distinctions may not be made regarding how programs use the system (i.e., performing useful work, or "thrashing"—causing excessive demand paging).

SUMMARY OF THE INVENTION

This invention provides a mechanism for analyzing a program's characteristics to determine whether its working set is close to optimal, from the standpoint of efficient use of central storage. In performing this analysis, the program's paging characteristics curve is plotted, its current position on the curve is determined, and its historical performance is "remembered". Within the framework of other existing resource management constraints, and when such analysis is needed, program characteristics are analyzed to set a target multiprogramming level, and to set target working set sizes for "key" programs. With these data, a mix of active programs is selected to optimize system productive CPU time.

It is thus an object of the present invention to provide an apparatus and method for efficiently managing job mix and program working set sizes.

It is also an object of this invention to perform individual working set size management when system load determines such management to be desirable.

It is a further object of this invention to manage job mix and working set sizes with the objective of improving system productive CPU utilization.

It is a further object of this invention to maintain and utilize a historical view of individual program characteristics in managing working sets and job mix, so that reversion to former referencing characteristics can be recognized and taken advantage of.

It is still a further object of this invention to provide a technique for forcing programs to exhibit page referencing characteristics, so as to be able to use this information in managing working set size and job mix.

BRIEF DESCRIPTION OF THE DRAWINGS

FIG. 4 is a block diagram illustrating Page Steal Processing.

FIG. 16 is a curve showing an address space's CPU cost for paging as a function of central storage allocated.

FIG. 17 is a curve showing an address space's productive CPU rate per resident second as a function of central storage allocated.

FIG. 18 is a curve showing a system's CPU cost for unmanaged paging as a function of idle frame seconds.

DESCRIPTION OF THE PREFERRED EMBODIMENT

Introduction

This invention uses algorithms to dynamically determine the best mix of work in the Multiprogramming Set (MPS)—the address spaces capable of using the processor at a given point in time (i.e., swapped-in)—and the most productive amount of central storage to allocate to each address space. A key objective is to maximize productive CPU time. Productive time is what the application (or program; or address space) is getting. CPU time the system is using to move pages to and from expanded storage or auxiliary storage is considered unproductive in this invention. Maximizing productive CPU time is an important consideration of this invention.

The method to achieve the objectives is to develop information about individual address spaces and their effect on the system and use that information to manage the mix of work in the multiprocessing system (MVS in this embodiment). To accomplish this, it is necessary to know how a job will behave with different amounts of central storage allocated, and how the system will behave with different amounts of central storage taken away. The task is to determine the amount of storage to allocate to an address space to maximize the productive work accomplished by the total system. This requires a balance between working sets allocated to large jobs that may swamp the system, working sets for other jobs, and storage to be used for logical swapping (a well-known concept in MVS, where inactive jobs are retained in central storage when there is a surplus of available central storage).

In this embodiment it is assumed that an LRU page replacement policy is used to choose which pages to remove from an address space whether it is managed according to this invention, or is an input to a global LRU policy. Alternate embodiments could take advantage of, e.g., sequential page reference characteristics.

Address Space Data

To determine the effect of allocating different amounts of central storage to an address space, a graph of each address space's paging characteristics is dynamically developed.

Figure 14:
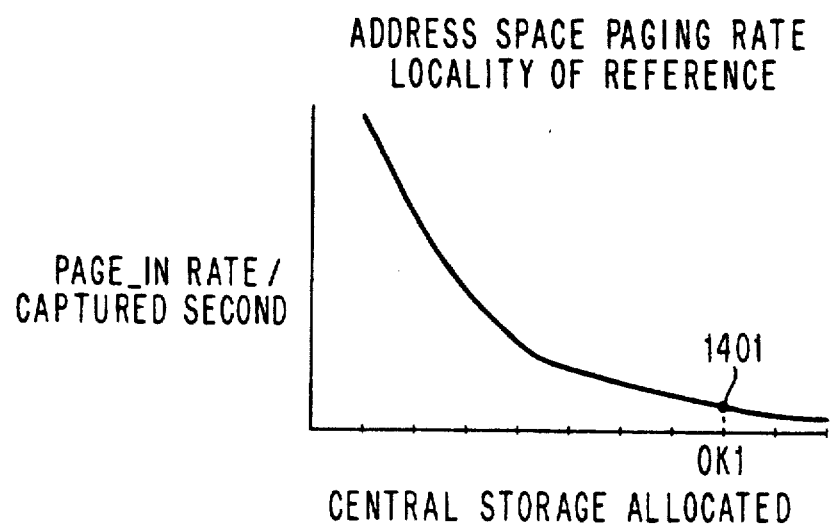
FIG. 14 is a paging characteristics curve for an address space with locality of reference.

A paging characteristics curve for an address space with locality of reference is shown in FIG. 14. The X axis is the number of central storage frames allocated to the address space. The Y axis is the address space's page-in rate per second of captured time. Captured time is the amount of TCB and SRB time accumulated by the address space. It is also known as productive time. The curve in FIG. 14 has a point called "OK1" 1401). The OK1 point is the central storage value where the address space can be run most productively. At OK1, the address space is running effectively and paging costs are only a small percentage of captured time (for example, paging cost less than 5% of productive CPU time). Allocating more storage to the right of OK1 will not have an effect on the address space's progress and can more effectively be allocated to other address spaces.

Figure 15:
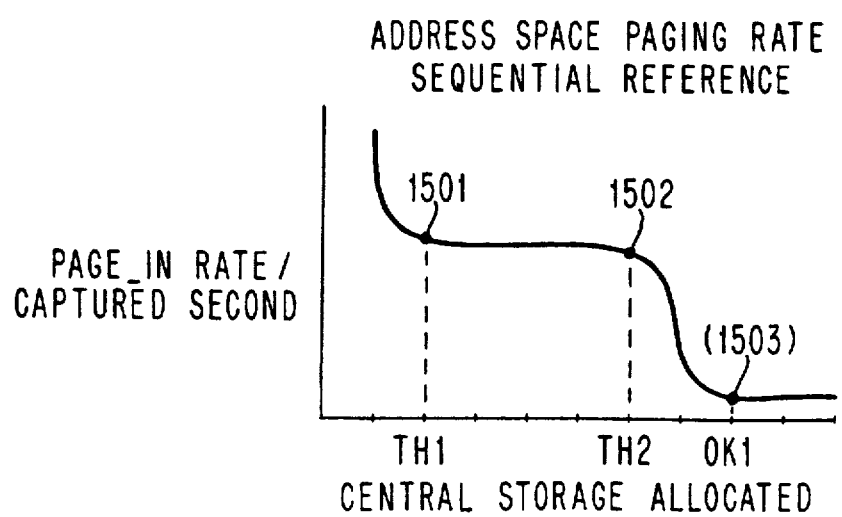
FIG. 15 is a paging characteristics curve for an address space with sequential reference.
Figure 19:
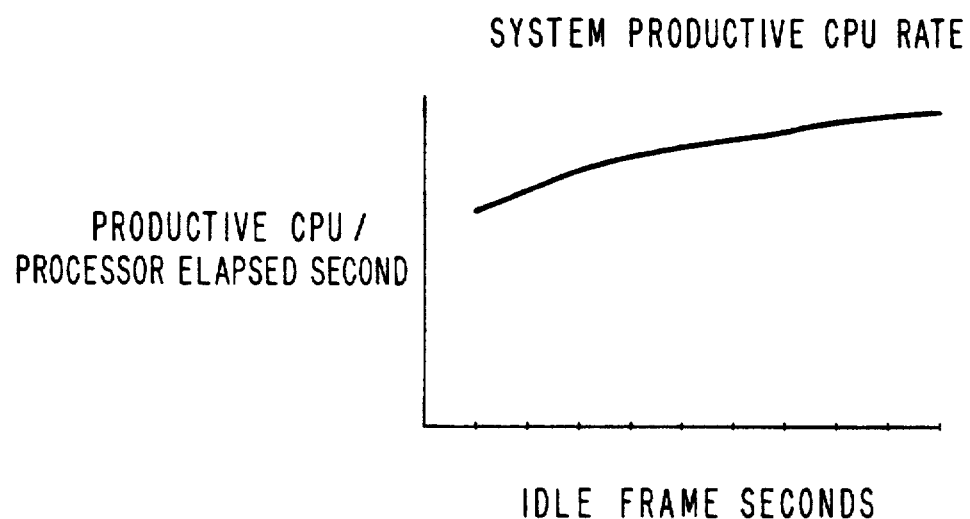
FIG. 19 is a curve showing a system's productive CPU rate per processor elapsed second as a function of idle frame seconds.

A paging characteristics curve for an address space with sequential reference is shown in FIG. 15. This curve has a thrash range (see below). An address space with a sequential reference pattern offers the opportunity for significant performance improvement when individually managed. A fully developed paging characteristics curve for an address space that is referencing data sequentially will generally have three points that can be used to effectively manage the address space's central storage allocation. The points are the OK1 point, the TH1 point, and the TH2 point.

The address space's thrash range is defined by its TH1 and TH2 points. TH1 (FIG. 15 at 1501) is the central storage value where the address space should be run if it cannot be run at OK1(1503). Additional storage would help it run more productively, but if the address space cannot be allocated enough storage to be moved to the right of TH2 (1502) it should be run at TH1. It will run just as well at TH1 and the additional storage between TH1 and TH2 can be made available to other address spaces.

TH1 (if it exists) also defines the address space's minimum point. (The discussion of FIG. 7, below, explains the definition of a "minimum point" if TH1 does not exist.) This is the minimum amount of storage that should be allocated to the address space. The address space's minimum is the point at which it will incur a significant (e.g., double) increase in paging for a small decrease in central storage allocated. If the address space is allocated less central storage than that defined by its minimum point, it should be either allocated additional central storage or be swapped out.

Developing these curves for selected address spaces allows determining effects of allocating different amounts of central storage to individual address spaces. However, additional data are needed to determine the effects on the system of adding the address space to the MPS or deleting it from the MPS. To determine these effects, additional curves are developed for each selected address space. There is one curve for each effect that is factored into subsequent algorithms: Paging Cost Rate, and Productive CPU Rate. In contrast to the Paging Rate Curve which was based on captured time, these curves are based on address space residency time. Residency time is the time that an address space was in the MPS—i.e., was allowed to compete for system resources. Captured time is used to determine the paging characteristics of the address space. Residency time is used to determine the address space's effect on the system. Residency time is used because an address space is occupying its central storage all the time it is swapped in, not just when it is executing.

The X axis for these curves is central storage allocated, the same as for the Paging Rate Curve. This is how the curves are related. The Y axis for each curve is described below.

The "Address Space Paging Cost Rate" curve (see FIG. 16) shows the address space's CPU cost for paging per resident second as a function of central storage allocated.

The Y axis units are milliseconds of CPU cost per second of resident time. The CPU cost for paging is computed, not measured—that is, the rate of pages transferred between central and expanded, and central and auxiliary, is measured, and a known (processor dependent) "CPU cost" is assigned for each type of transfer to compute the CPU cost rate. The computation considers the different CPU cost for paging from expanded versus auxiliary and the different CPU cost for paging. As an address space is allocated additional central storage, the CPU cost for paging will tend to decrease.

The "Address Space Productive CPU Rate" curve (see FIG. 17) shows the address space's productive CPU rate per resident second as a function of central storage allocated. The Y axis units are milliseconds of productive CPU per second of resident time. The productive CPU value is measured. It is the sum of TCB and SRB time as described previously. As an address space is allocated additional central storage, the productive CPU rate will tend to increase.

Figure 21:
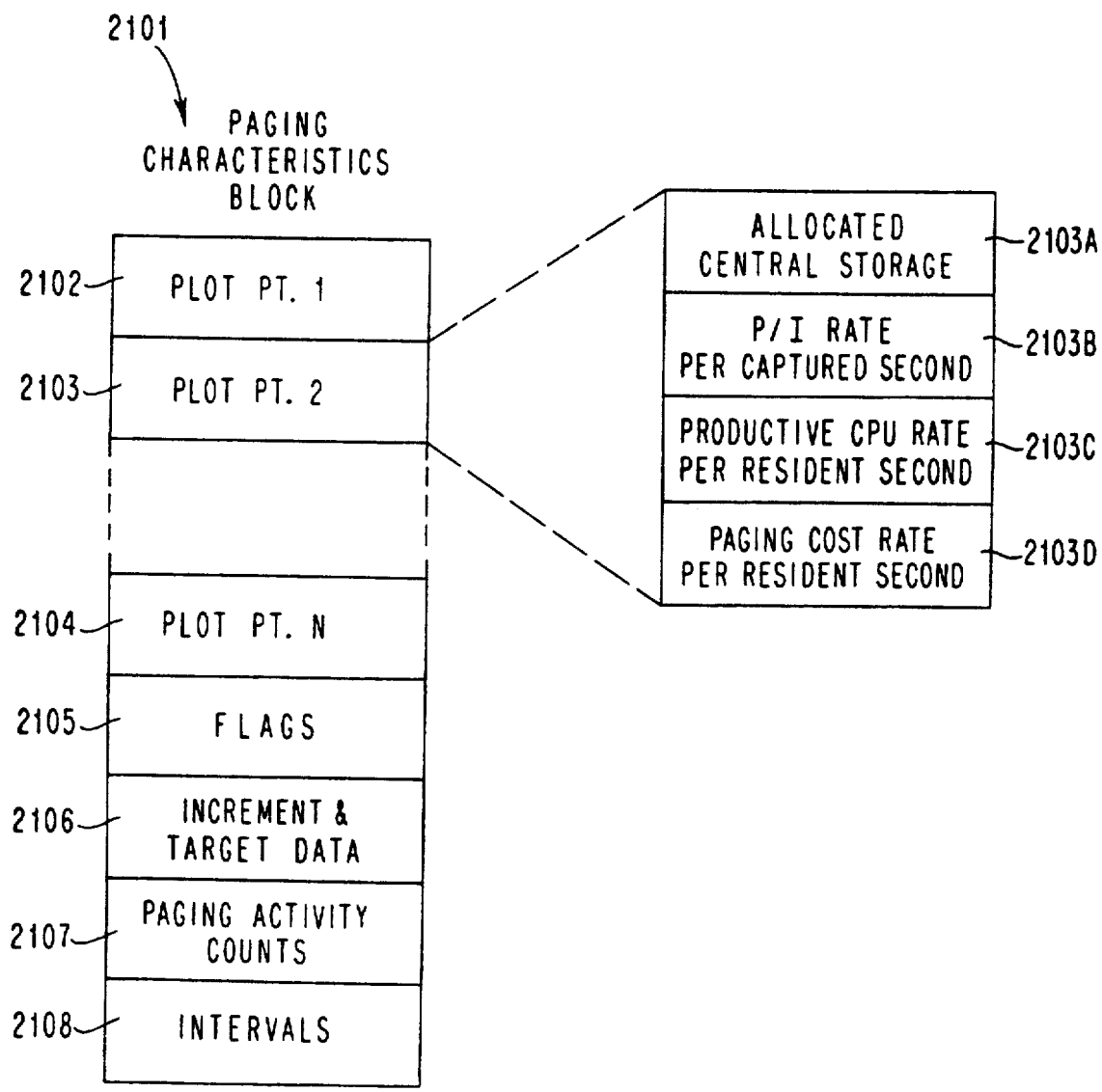
FIG. 21 is a control block diagram illustrating a Paging Characteristics Block of this invention.

FIG. 21 illustrates an Address Space Paging Characteristics Block used in the present invention to maintain address space paging data. Each point plotted is represented sequentially (2102, 2103, 2104), and comprises the point's allocated central storage (2103A); its page-in rate per captured second (2103B); its productive CPU rate per resident second (2103C); and the paging cost rate per resident second (2103D). There are also flags 2105 indicating that an OK1 action was attempted; that an OK1 action is in progress; that the address space has been "out too long" (see below); and that room has been made for an address space that has been out too long (this one). There is other data 2106 including the X axis increment size; the Y axis increment; the target; the time when the target was imposed; the OK1 X axis increment index; TH1 X axis increment index; "recent point" X axis increment index; target action intervals remaining; target action captured time intervals remaining. Finally, there are paging activity counts 2107 (including pages read from expanded, pages read from auxiliary, pages stolen to expanded, and pages stolen to auxiliary), and the number of intervals 2108.

System Data

The address space curves provide information about the effect of allocating more or less central storage to an address space and the effect of the address space on the system when different amounts of storage were allocated to it. What is needed to complete the picture is the effect on the rest of the jobs in the system of having more or less central storage available for working sets and logical swapping. To determine this, system curves are developed, similar to the address space curves.

Idle Frame Seconds

Simply using allocated central storage for the X axis is not possible for the system curves because in systems such as MVS, allocated frames will expand to fill available frames. This problem is solved by defining a new measure of available storage that takes into consideration the time value of the storage. This measure is "idle frame seconds" An idle frame second is a measure of a frame that has been idle for one second. For example, a frame that has not been referenced for four seconds would have been idle for four seconds and would represent four idle frame seconds. Another example: a frame belonging to a logically swapped address space that has been logically swapped for 20 seconds and is no longer protected by think time would represent 20 idle frame seconds. All system curves were plotted with idle frame seconds on the X axis.

The "System Paging and Swap Cost Rate" curve (see FIG. 18) shows the system's CPU cost for paging and swapping per processor elapsed second as a function of idle frame seconds. This paging is the paging attributable to address spaces that are not being individually monitored or managed by this invention. Processor elapsed time is elapsed time times the number of processors,. The Y axis units are milliseconds of CPU cost per processor elapsed second. The CPU cost for paging is computed as described for the address space Paging Rate curve.

The "System Productive CPU Rate" curve (see FIG. 9) shows the system's productive CPU rate per processor elapsed second as a function of idle frame seconds. The Y axis units are milliseconds of productive CPU per processor elapsed second. The productive CPU value is measured. It is the system-wide sum of TCB and SRB time (adjusted for paging and swapping done in TCB and SRB mode).

These curves fully integrate the system effects of allocating central storage to active address space working sets and logically swapped address spaces. When the curves have been developed for the system and for all address spaces of interest, it is possible to determine if a different allocation of central storage frames will result in a higher productive CPU rate.

Analysis Routines

Following is a treatment of key aspects of this invention. After that, a presentation of detailed logic is provided.

Management of individual programs—or address spaces—with this invention will be activated only when the paging and swapping in the system is observed to be excessive. And it will only be activated for address spaces that are observed to be spending an excessive percentage of their CPU time paging. Most of the address spaces in the system will continue to be managed with global LRU page replacement. Address spaces are selected and deselected as conditions change.

Point Finding Algorithms: This invention will, at times, force address spaces to exhibit their full range of paging characteristics to find their minimum and OK1 points. System curves are developed without any intervention, but individual address spaces are sometimes not. Left alone, address spaces that fit in storage will quickly acquire an OK1 amount of central storage and with no information about their thrash range. Address spaces that do not fit will settle somewhere between TH1 and TH2, yielding no information about their minimum and OK1 points.

Two methods are provided to get the address spaces to exhibit all their important characteristics. When an address space is first selected, an attempt is made to get it to its OK1 point by protecting it from page replacement, swapping other address spaces out, and restricting other address spaces to run at their TH1 or minimum values. If the address space does succeed in reaching OK1, no further action is needed. The address space is permitted to run at OK1 as long as it can hold its frames in competition with other address spaces in a normally running system. If none of these extraordinary measures succeed in allowing the subject address space to reach OK1, the address space's OK1 point is defined to be the address space's total virtual storage requirement. This point is not actually plotted, but is used to define the shape of the curve.

When the system experiences demand for central storage, the invention forces address spaces that had not already done so to exhibit their TH1 or minimum points. This is accomplished by allocating each address space less and less central storage until it moved to the left of its TH1 or minimum point. At that point it is moved back to its TH1 or minimum point. This moving the address space to the left accomplishes the dual purposes of obtaining central storage to satisfy the demand from other address spaces and of finding additional points for the subject address space.

Best Fit Algorithm: Key to the invention is the best fit analysis. All of the other algorithms in one way or another support this one. This algorithm determines how many monitored and managed address spaces to keep in the MPS and how much central storage to allocate to each. The algorithm analyzes the effect of reallocating some or all of one address space's central storage frames to another address space.

The X axis of each address space's plot is divided into a fixed number of X axis increments. Each increment represents an equal number of frames. All observations must be represented in one of these increments. The increment size can expand and contract to accommodate any size central storage allocated to an address space. When considering reallocating some of one address space's frames to another address space, the unit of reallocation is an X axis increment of frames.

Partial frame reallocation analyzes the effect of reallocating frames from one or more address spaces to another address space while keeping the number of address spaces in the MPS constant.

In the following discussion, receiver is an address space under consideration to receive additional central storage frames. Donor is an address space under consideration to donate frames to the receiver.

The formula for determining the value of reallocating a number of frames from one or more donor address spaces to a receiver address space is shown below.

1. Net value to system = delta_rec_as_paging_cost − delta_donor_as_paging_cost delta_rec_as_paging_cost is the receiver address spaces projected paging cost rate at its contemplated new central storage allocation minus its current paging cost rate.

delta_donor_as_paging_cost is the total projected paging cost for all the potential donor address space's at their new contemplated central storage allocations minus their current paging costs.

The partial frame reallocation part of the best fit algorithm works by repeatedly searching for the donor address space that would increase its paging cost rate least by donating an X axis increment of frames to the receiver. The algorithm continues searching until enough frames have been accumulated to get the receiver to the central storage allocation selected. When enough frames have been accumulated, the formula is applied and if the result is positive, the frames are reallocated to the receiver.

Figure 20:
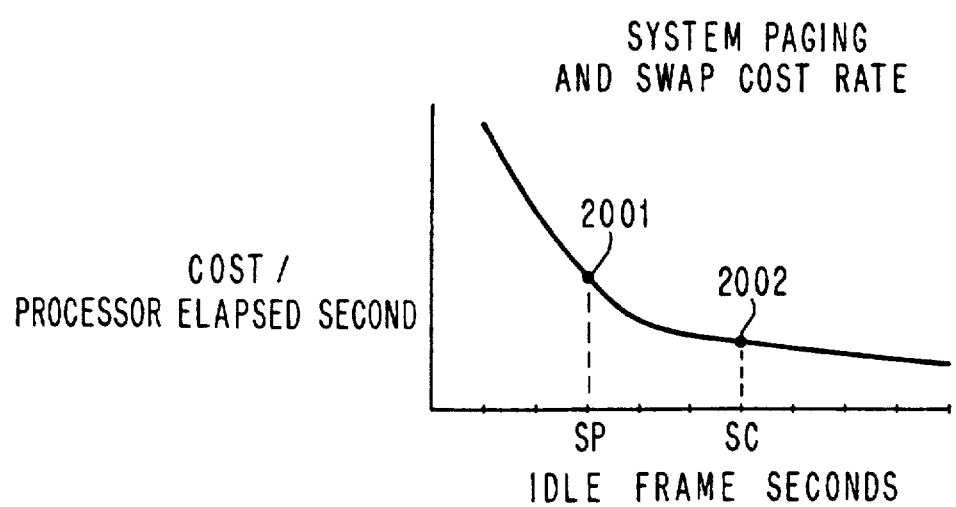
FIG. 20 is a curve showing system unmanaged paging and swap cost rate, illustrating points "SP and SC".

Full frame reallocation analyzes the effect of reducing the number of address spaces in the MPS. In the following discussion, receiver is an address space under consideration to receive enough additional central storage frames to be able to run at OK1. Donor is an address space under consideration to be swapped out so that its frames can be made available to the receiver. SC and SP are X axis points on the system curves. SC represents the current system state. SP represents the projected system state if the contemplated action is taken. Within the algorithms, SC and SP represent idle frame seconds values read off the system curves. However, in the discussion, SC and SP will be assumed to represent numbers to frames. This assumed translation is done to avoid continually having to give a long description of the translation. For example, in FIG. 20, the distance between points SC (2002) and SP (2001) represents the difference in the state of the system when it is running with SC-SP fewer idle frame seconds. When algorithms that use this curve are discussed, the distance between points SC and SP will be assumed to represent the difference in the state of the system when it is running with SC-SP fewer frames. Thus, in the following discussion, SC is the current state of the system. SP is the projected state of the system after the donor address spaces have been swapped out and the receiver address space is running at OK1. SC-SP is the number of frames to be contributed by the system to make up the difference between what the receiver needs to run at OK1 and what the donors contribute.

The formula for determining the value to the system of swapping out one or more donor address spaces so that their frames can be made available to a receiver address space in order for the receiver address space to run at OK1 is shown below.

2. Net value to system = delta_rec_as_productive − delta_rec_as_paging_cost − donor_productive + donor_paging_cost − delta_sys_productive − delta_sys_page_swap_cost delta_rec_as_productive is the receiver address space's projected productive CPU rate at OK1 minus its current productive CPU rate.

delta_rec_as_paging_cost is the receiver address space's projected paging cost rate at OK1 minus its paging cost rate. This will be a negative number which when used in the equation will result in a positive contribution to the net value.

donor_productive is the total current productive CPU rate attributed to all the potential donor address spaces. donor_paging_cost is the total current paging cost attributed to all the potential donor address spaces.

delta_sys_productive is the system productive CPU rate at SC minus the rate at SP.

delta_sys_page_swap_cost is the system unmanaged paging and swap cost rate at SC minus the rate at SP.

The full frame reallocation part of the best fit algorithm works by searching, within the installation minimum MPL specification, for the least productive address spaces in the system that can be swapped out. As it finds potential donor address spaces, it uses the formula above to assess the value to the system of swapping the donor address spaces out and allocating their frames, potentially along with SC-SP system frames to the receiver address space. When it finds a winning combination, it swaps the donor address spaces out and sets up the receiver to run at OK1. Any extra donor address space frames that are not required by the receiver are reallocated to the managed address space that is running closest to its OK1 point.

Phase Change Detection Algorithm: When an address space transitions from one phase of its processing to another, its paging characteristics may change, and it is possible for certain types of paging characteristics phase changes to remain undetected. This can happen if an address space is being continually managed to x frames and its paging characteristics change such that only a few more frames would allow it to run at OK1. The only way to detect this type of phase change is to try it. This is done periodically by allowing the address space to run unmanaged in case there is data to be gained that would be missed if the address space were always managed. If running the address space unmanaged proves to be harmful, it is detected, and the algorithm will wait a longer time the next time before trying again.

Out Too Long Algorithm: The out too long algorithm recognizes that even an address space that has a negative effect on the productive CPU rate has to be run sometime. If an address space is passed over because the swap-in impact algorithm gives it a negative recommendation value, the out too long algorithm assures that the address space will not be left out forever. An out too long clock is started for the address space. When it expires, enough other address spaces will be swapped out to make room for the out too long address space.

Swap-In Impact Algorithm: The most important feature of the swap-in impact algorithm is that it selects address spaces to swap in, and allocates central storage to them, in a way that results in the best possible productive CPU rate for the system as a whole. The address space is either swapped in at its most productive point (OK1), or if the system can accommodate the projected additional paging, at TH1 or minimum. This optimizes central storage use.

Address spaces that can be allocated enough central storage to run at OK1 are always the best candidates to be swapped in. By definition, an address space running at OK1 will not be paging significantly. Its contribution to the system paging cost rate will be insignificant. All or almost all of the CPU time it consumes will be productive.

When there is not enough central storage to run an address space at OK1, but there is enough to run it above its minimum point, the impact analysis becomes more complicated. An address space swapped in to run at TH1 will be thrashing, but the rest of the system will be protected, and if there are CPU cycles available to handle the paging, being in and thrashing is better than being on the out queue.

If more than one address space is a candidate to be swapped in and run at TH1, the address space with the highest net CPU value to the system will be the address space swapped in. The address space's projected productive CPU rate and paging cost rate can be read off the address space's curves directly. The effect on the system's productive CPU rate and paging cost rate is determined from the system curves at SP, where SP is the projected system state if the address space was swapped in to run at TH1. SP is the projected state of the system running with TH1 (or minimum) fewer frames. The net productive CPU value of adding the address space to the MPS is shown below.

3. Net CPU value to system = as_productive − as_paging_cost − delta_sys_productive − delta_sys_page_swap_cost as_productive is the address space's projected productive CPU rate at TH1 (or minimum). as_paging_cost is the address space's projected paging cost rate at TH1. delta_sys_productive is the system productive CPU rate at SC minus the rate at SP.
delta_sys_page_swap_cost is the system unmanaged paging and swap cost rate at SC minus the rate at SP.

System Target Adjustment Algorithm: The individual target adjustment algorithms discussed so far are organized into a single feedback loop. On each invocation of the algorithm, the cases are considered in order until an action is taken or there are no more cases to consider. The cases are shown below along with the possible actions taken for each.

1. CPU utilization high swap
2. central storage low swap or manage or reduce MPL or end OK1 action
3. OK1 action swap or manage or quit
4. out too long multiple swap
5. underutilized raise MPL
6. out of balance exchange MPLs
7. unmanaged paging manage
8. phase change unmanage
9. managed paging multiple reallocations multiple swap and unmanage and reallocation MPL adjustment criteria are used to determine when Case 1 or 2 applies. The central storage low case will also consider reducing the central storage allocation for a managed address space as well as considering swapping an address space out to relieve the shortage.

If the system is not overutilized, Case 3 is reached, taking action to help an address space reach OK1. This is the highest priority goal if the system is otherwise running acceptably. The actions taken for Case have already been described.

Case 4 recognizes that even an address space that has a negative effect on the productive CPU rate has to be run sometime. If such as an address space exists, making room for it is the next highest priority task. This is described in the discussion of "Out Too Long Algorithm" above.

MPL adjustment criteria are used to determine when Cases 5 or 6 apply. Both Case 3, OK1 action, and Case 4, out too long, are likely to affect utilization, so they are considered prior to Cases 5 and 6.

If Case 7 is reached, the system is running well except for spending unproductive CPU cycles paging. The situation will either be corrected here, by reducing a managed address space's central storage allocation or by managing an additional address space, or in Case 9. Case 7 actions are described in "Point Finding Algorithms" above.

If Case 8 is reached, all that can be determined analytically about the system and address space paging is know, but something may have changed. Case 8 recognizes that the other algorithms may not always recognize a phase change. The actions taken for Case 8 are described in "Phase Change Detection Algorithm" above.

Case 9 is the heart of the algorithms and where the best fit of address spaces in the MPS is determined. At this point all OK1 points are known or known to be unreachable, and most or all TH1 points (or minimum) have been determined. This algorithm first looks at the distribution of central storage to determine if a different allocation of central storage would result in the total system running more productively. If a better distribution is found, central storage is reallocated from donor to receiver address spaces. If no better distribution of storage is found, this algorithm looks at all the address spaces in the MPS and determines if there is a better mix. If a better mix exists, donor address spaces will be swapped out and receiver address space will be run at its OK1 point. This is described in "Best Fit Algorithm" above.

Details

Figure 1:
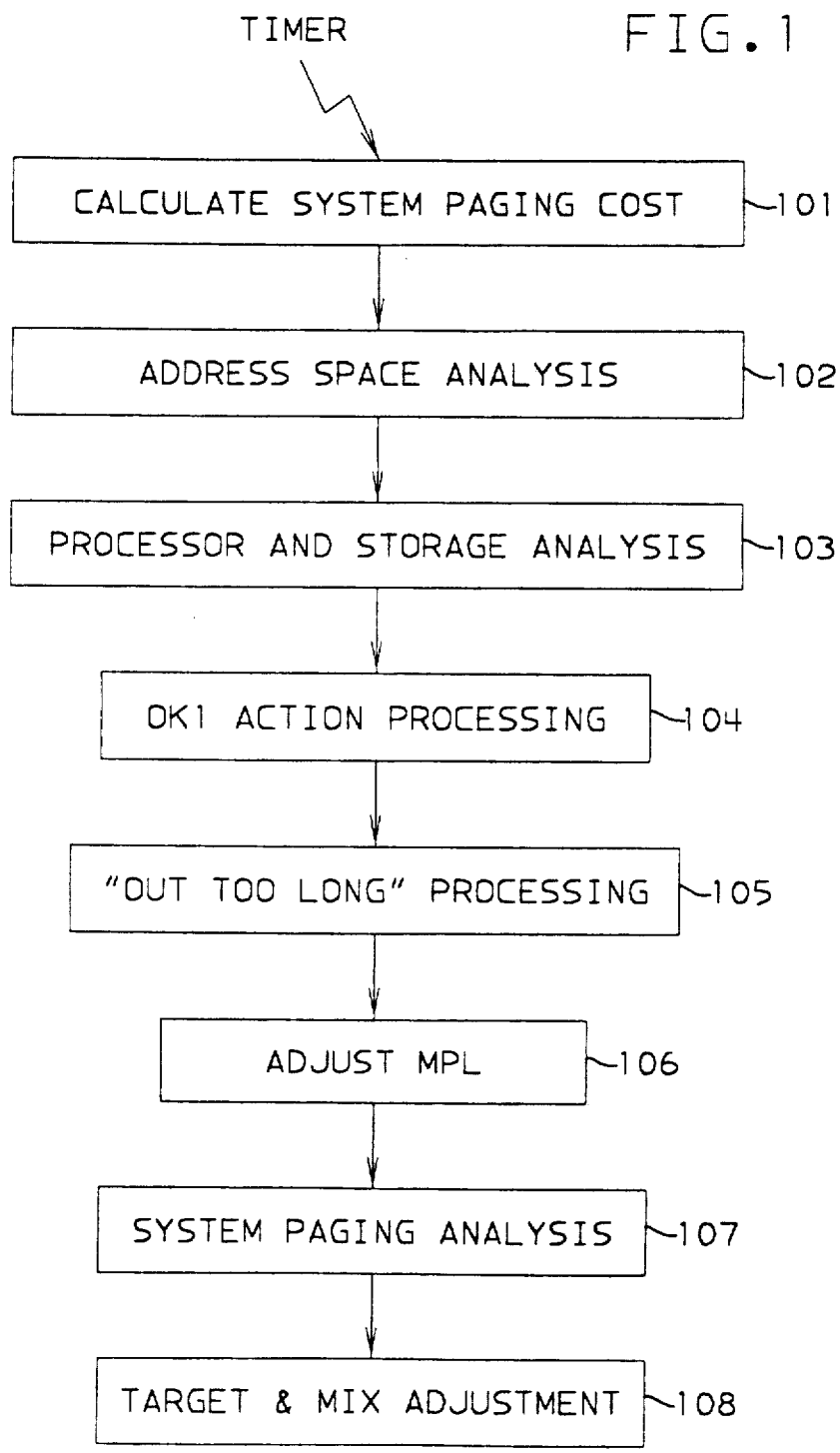
FIG. 1 is a block flow diagram illustrating the principal features of the present invention.

FIG. 1 illustrates the principal features of the present invention and control flow within these features. At 101, periodically—after the expiration of a set time interval (e.g., 2 seconds on an IBM 3090 J processor), the total system paging cost is computed for all of the paging activity since the previous timer expiration. The cost is calculated by assigning a cost to each type of paging activity and multiplying each page count by the associated cost (e.g.—on a 3090J, a page transfer to expanded requires 68 microseconds; to auxiliary, 130 microseconds). The types of paging activity which are factored into the calculation are described in the supporting text for FIG. 2, paging activity counting.

Figure 6A:
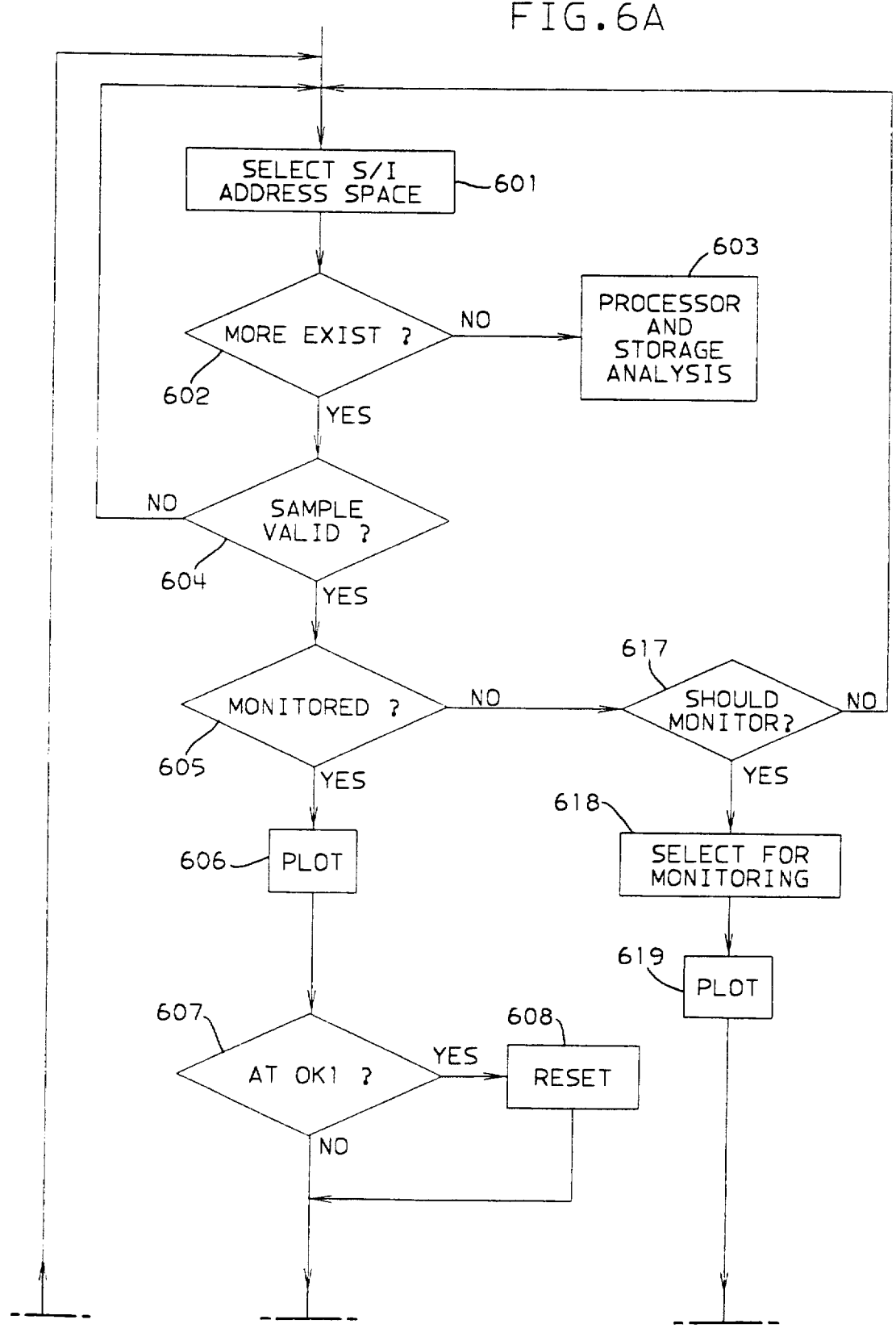
FIGS. 6A and 6B are flowcharts illustrating control flow for Address Analysis.
Figure 6B:
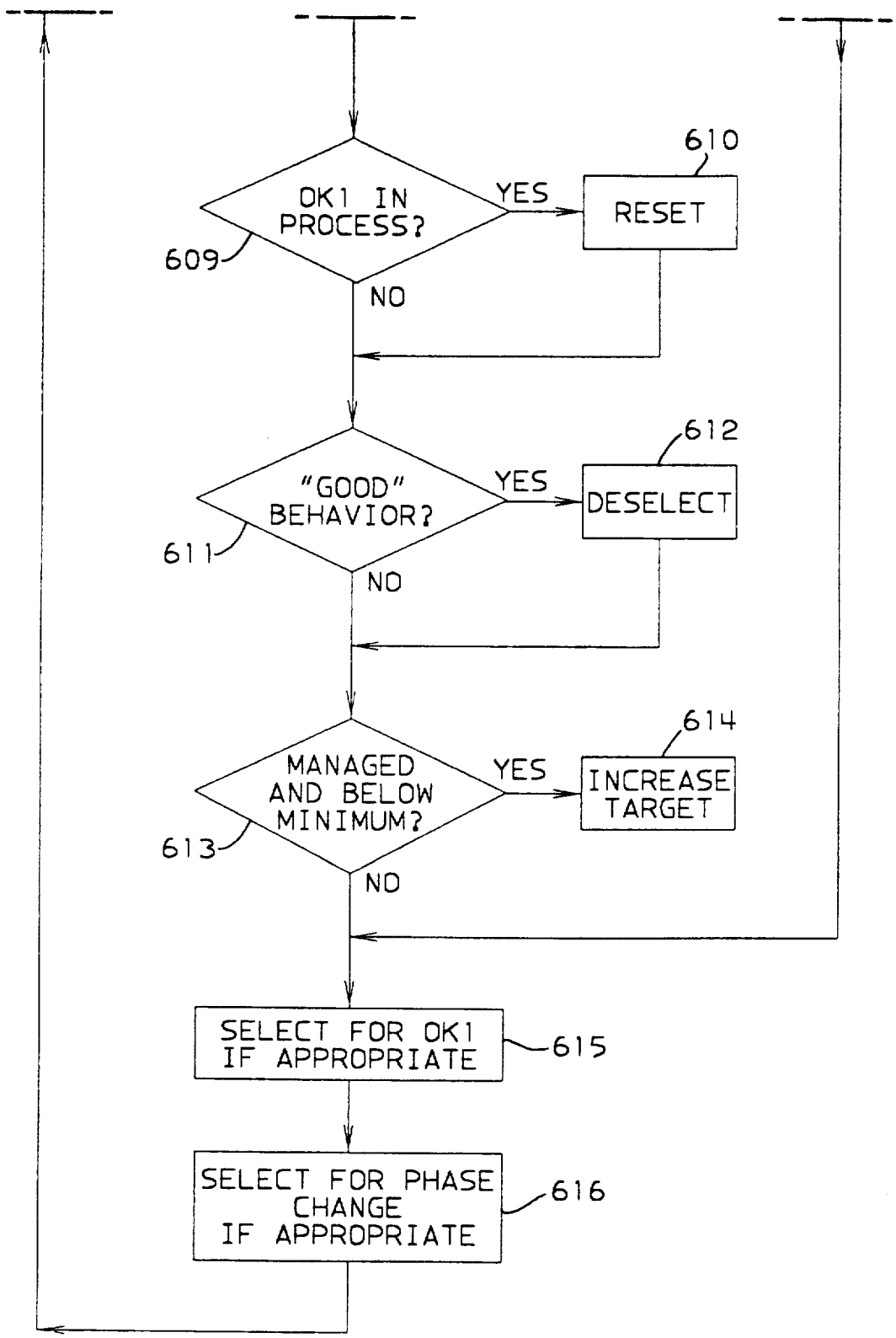

After calculating system paging costs, address space analysis is preformed for all swapped-in address spaces 102. The details of address space analysis are illustrated in FIG. 6 and the supporting text below. In general, address space analysis calculates significant data associated with each swapped-in address space that is monitored, and selects and deselects address spaces for monitoring based on defined criteria.

After address space analysis processing, processor and storage analysis is performed 103. Details of this processing are described in FIG. 8 and the supporting text below. The focus of this processing is to take action to swap-out an appropriate address space in the event of an over utilization of processor or storage resource. Next, 104, OK1 Action Processing is performed. An OK1 action is an action taken to allow an address space to "grow" (acquire additional central storage) for the duration of the action interval to determine its "OK1 point". (See the Introduction, and FIG. 7 and its supporting text for additional information on this point. An OK1 interval is the minimum of (for example) 20 real time intervals, until the address space reaches its OK1 point or until the address space can no longer grow. The address space can no longer grow if, for example, the system has been in a central storage low condition for two seconds with no other options available to steal or swap to provide central storage frames. An OK1 action is done once during the life of the address space. Details of this processing are in FIG. 9 and its supporting text.

Next, 105, "Out too long" processing is invoked to handle the case of an address space swapped out too long. See FIG. 10 and supporting text for detail. MPL Adjustment 106 is then performed to increase the Systems Multiprogramming Level (MPL) if needed because of resource under utilization—See FIG. 11 and supporting text.

Next, System Paging Analysis is invoked 107 to attempt to improve system paging characteristics if the paging subsystem is overburdened, by selective reduction of storage allocation of "Managed" address spaces (i.e.—address spaces which have central storage targets assigned—or maximum central storage allocations to which they are managed), and to initiate phase change conditions. See FIG. 12 and its supporting text for additional detail.

Finally, Target and Mix Adjustment is invoked 108. This function considers changes to central storage targets for managed address spaces, and to the mix of address spaces active (swapped-in) at one time—with goals of improving both individual address space performance, and improved system productivity. This function is described in greater detail in FIG. 13 and its supporting text.

Figure 2:
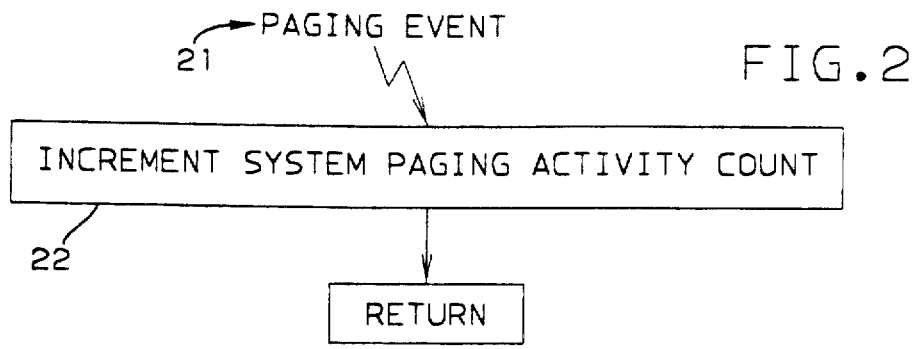
FIG. 2 is a block diagram illustrating Paging Activity Counting.

FIG. 2 illustrates paging activity counting. This processing is event driven, and it triggered on an ongoing basis each time a page is moved to or from expanded storage, or to or from auxiliary storage. The counts are: pages read from expanded, pages read from auxiliary, pages stolen to expanded, and pages stolen to auxiliary. (As previously mentioned, these counts are kept in the Address Space Paging Characteristic Block, FIG. 21 at 2107.)

Figure 3:
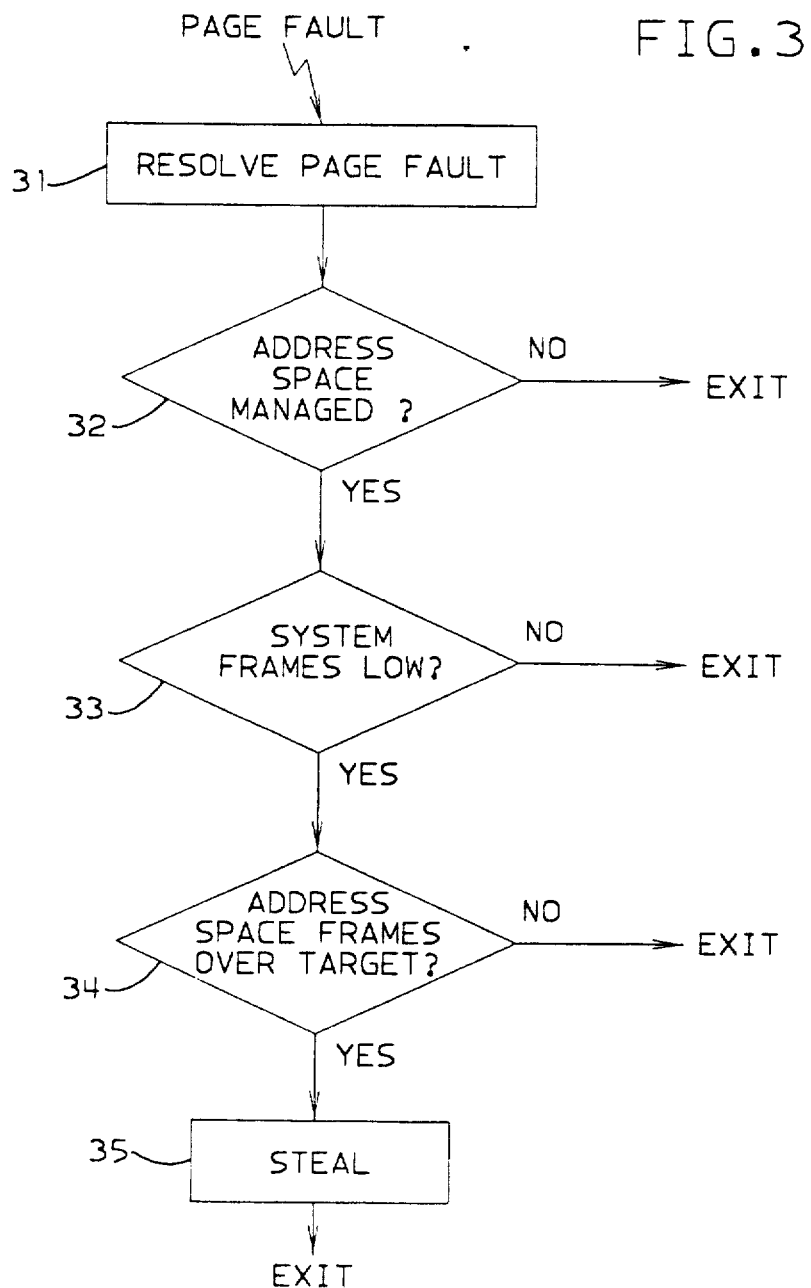
FIG. 3 is a block diagram illustrating Page Fault Processing.

FIG. 3 illustrates what needs to be done as part of page fault processing for this invention. At 31, after the receipt of a page fault, the page fault is resolved conventionally. A check is then made at 32 whether the address space associated with the page fault is Managed. If not, the routine is exited. If the address space is Managed, a test is made 33 whether the supply of system available frames is low (a conventional indication in MVS). If the supply is not low, the routine is exited. If the supply is low, a test is made 34 whether this address space has more than its target number of frames (kept in the paging characteristics block as previously noted, FIG. 21). If not, the routine is exited. If the address space has more than its target number of frames, pages are conventionally stolen from the address space 35 (to increase the supply of frames on the conventional available frame queue—to reach its "OK" threshold). The routine is then exited.

FIG. 4 illustrates page steal processing in accordance with this invention. At 41, a conventional test is made whether the system available frame supply is low. If the supply is not low, the routine is exited. If the supply is low, pages are stolen from Managed address spaces 42. Pages are stolen from each address space that has a target (is Managed), and has more than its target number of frames (again, to reach the "OK" threshold of available queue frames). A test is then made 43 whether the system available frame supply is still low. If not, the routine is exited. If it is low, frames are stolen from all address spaces on a global LRU basis 44, and the routine is exited.

Figure 5A:
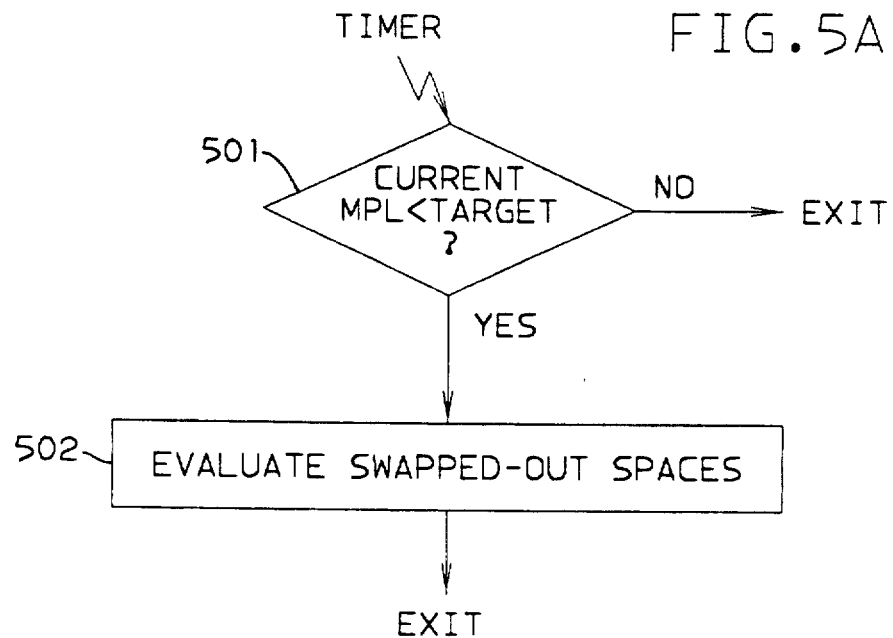
FIGS. 5A and 5B are flowcharts illustrating control flow for Swap-In Processing.
Figure 5B:
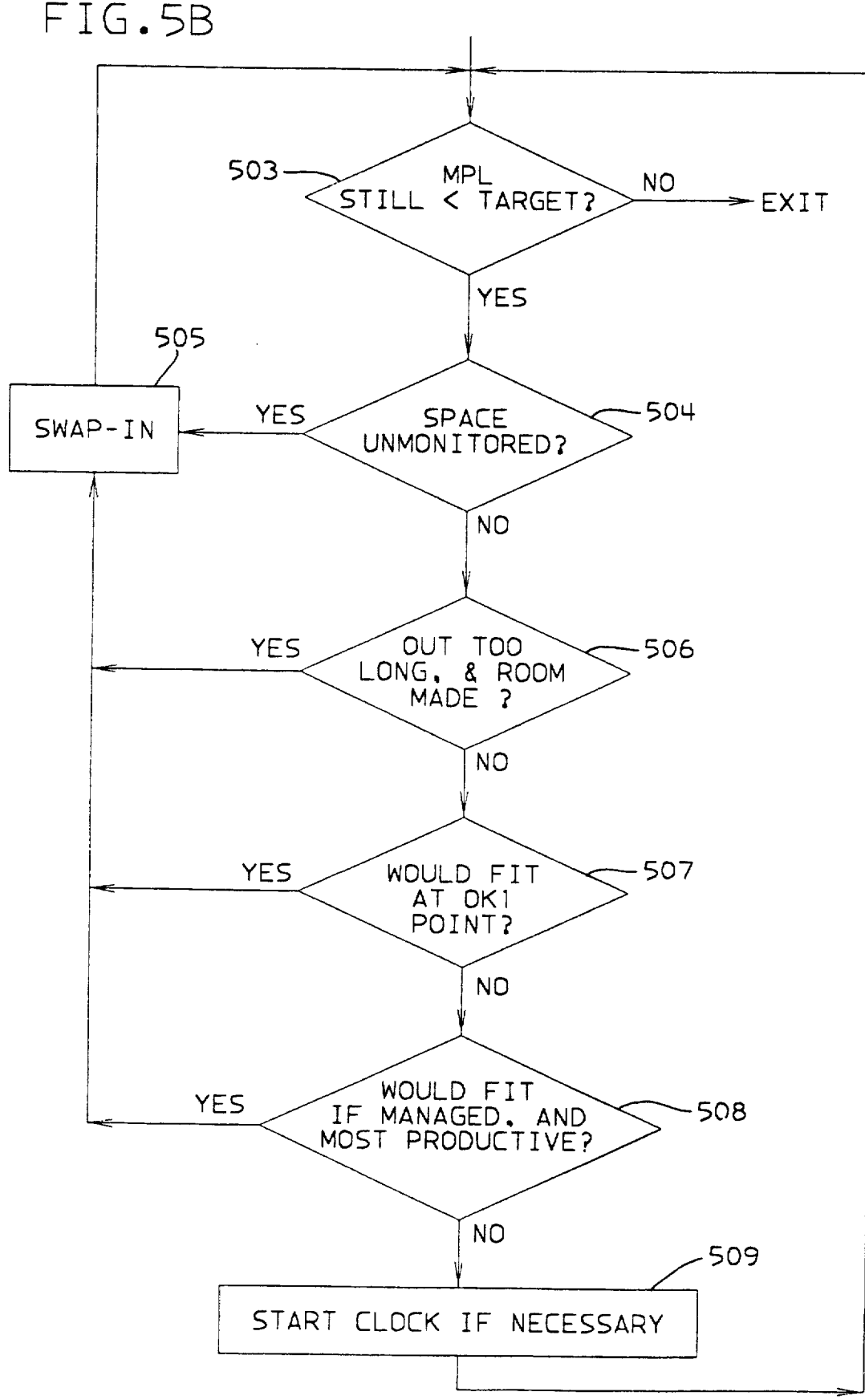

FIG. 5A and 5B illustrate control flow for Swap-In processing. At 501, a conventional test is made whether the current system multiprogramming level is below the target system multiprogramming level (a conventional installation—controllable figure in MVS). If not, the routine is exited. If so, swapped-out address spaces are evaluated to select address spaces to swap-in 502. FIG. 5B shows the detail of this evaluation.

At 503, a test is made whether the system multiprogramming level is still below the system target. If not, the routine is exited. If it is below target, a test is made whether the address space under consideration is unmonitored 504. If it is an unmonitored address space, it is swapped-in 505. The unmonitored address space is swapped-in 505, and the next swapped-out address space is considered at 503 again. If the address space is not unmonitored (i.e. It is a Monitored address space). A test is made 506 whether the address space has been "out-too-long" (See "Out-too-long" algorithm in the introduction above, and FIG. 10 and its supporting text. For example, an address space may have been bypassed for swap-in for a predetermined amount of time—e.g., 10 minutes, and whether sufficient space exists for it to be swapped-in (conventionally available in the available frame queue). If it is out-too-long and room has been made for it, it is swapped-in 505 and the next swapped-out address space is considered again at 503. If the answer to the test at 506 is no, a test is made whether the address space would fit in central storage at its "OK1" point 507. If so, it is swapped-in in the Monitored state 505, and the next swapped-out address space is considered at 503. If the answer to the test at 507 was no, a test is made 508 whether the address space could fit in if it were managed, and it would make the highest contribution to the system productive CPU rate (see formula 3 in the introduction). If so, it is swapped-in in the Managed state 505, and the next swapped-out address space is considered at 503. If the test at 508 resulted in a no result, a "out-too-long" clock is started for the address space, the address space is skipped, and the next swapped-out address space is considered at 503. This process continues until all swapped-out address spaces have been considered.

FIG. 6 illustrates control flow for address space analysis. At 601, the first (or next) swapped-in address space is selected. A test is made 602 whether there is in fact an additional address space to be considered. If not, processor and storage analysis 603 is invoked—this processing is detailed below in FIG. 8 and the supporting text. If an additional address space exists and has been selected, a test is made 604 whether the address space has executed long enough (e.g.—time to execute 2 million instructions on an IBM 3090 processor) to have its paging counts represent a valid sample. If not enough valid data exists, the next swapped-in address space is selected 601. If the sample data is valid, a test is made 605 whether the address space is Monitored. If it is a Monitored address space, key data points are plotted for the address space 606. The details of this plotting are described below in FIG. 7 and the supporting text. Next, 607, a test is made whether the address space is running at its OK1 point. If it is, any remaining target action intervals are cleared 608 (kept in the Paging Characteristics Block (FIG. 21) as noted above). Next, a test is made whether the address space has an OK1 point and has an OK1 action in progress 609. If so, the OK1 action is ended, and any remaining target action intervals are cleared 610. Next, a test is made 609 how the address space has been behaving recently in terms of its central storage utilization. If the address space has been observed (plotted) to be in its OK range (see below) for many (e.g.—10) successive plots, and its central storage allocation is less than the average central storage allocated to all Monitored address spaces, it is deselected for management if it has been Managed before, and it is deselected for Monitoring 612. Next, 613, a test is made if the address space is Managed and is running below its minimum point (TH1, as noted above). If so, its central storage target is increased by one X axis increment 614. Next, 615, the address space is selected as an OK1 action candidate if appropriate. It is appropriate, if the address space has never previously reached OK1, if an OK1 action has not yet been attempted for it, and if there is no other action in progress for it. Next, 616, the address space is selected as a phase change action candidate if no other phase change action candidate was selected during this invocation, and enough time has elapsed since it was selected for management (for example, 3 minutes). Then the next swapped-in address space is selected for analysis at 601 and processing continues as above. If the test at 605 indicated that the address space under consideration is not Monitored, a test is made 617 whether the address space should be Monitored. It should be Monitored if the total system paging cost exceeds a threshold—e.g., 5% of the available processor time, and the address space is using more than (e.g.) 5% of its captured time doing paging, or is larger than the average size of all other Monitored address spaces. If so, the address space is selected for Monitoring 618, points are plotted as detailed below in FIG. 7 and its supporting text, and 619, and processing continues as indicated above for step 615.

Figure 7:
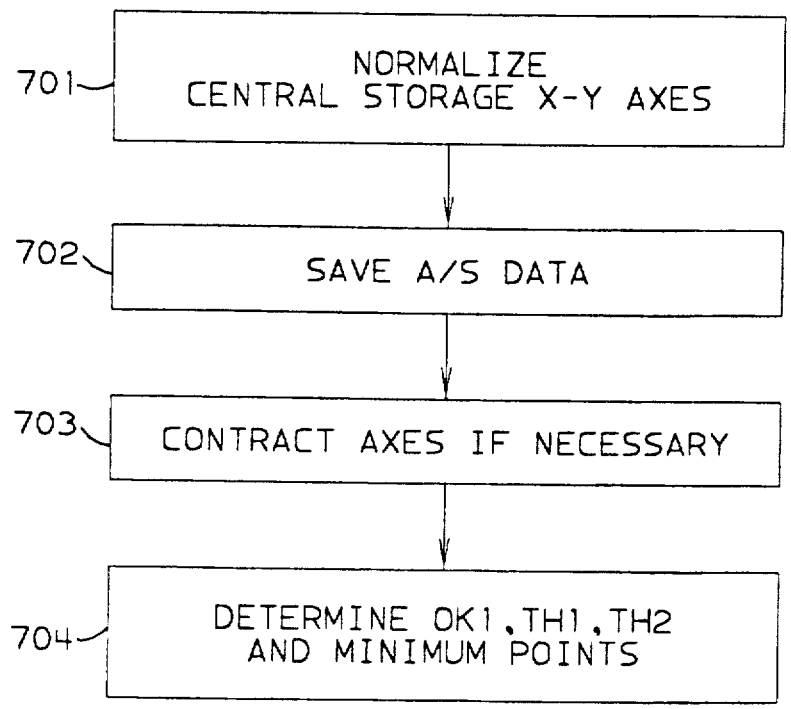
FIG. 7 is a flowchart illustrating point plotting.

FIG. 7 illustrates control flow for point plotting. The results of this plotting are kept in the previously mentioned Paging Characteristics Block (see FIG. 21). The concepts behind these curves and points have been detailed above, in the introduction, under Address Space Data". First, 701, the X and Y axes are normalized for central storage use for this address space. Normalizing is required if the current central storage allocated to the address space is not within the current range of the X axis. As noted above, the X axis of the plot consists of a fixed number (e.g., 10) of X axis increments. Each increment represents an equal number of frames. When the address space is first monitored, the increment size is determined by the central storage allocated to the address space at that point. The increment size is set so that the observed allocated central storage will fall into one of the increments in the right half of the plot. When the current central storage size of the address space exceeds the storage size represented by the last plot X axis increment, the X axis range is expanded by doubling the amount of storage represented by each increment, and moving the plot data from the original two associated X axis increments to the new double sized increment. Similarly for the Y axis, the axis needs to be expanded only if the current page-in rate for the address space is not within the current range of the page-in rate Y axis. The Y axis range is divided into a fixed number (e.g., 10) of increments. Each increment represents an equal number of pages per captured second observed for the address space. (The determination of the increment size is as described above for the X axis increment.) When the current page-in rate per captured second for the address space exceeds the page-in rate represented by the total Y axis range, the Y axis range is expanded by doubling the page-in rate represented by each increment. Next, 702, address space data is saved. The current X axis increment index is computed based on the central storage allocated to the address space, and the new paging data is saved in the Y axis slots corresponding to the computed X axis increment. The data saved are: central storage allocated, page-in rate per captured second, productive CPU rate per resident second, and paging cost per resident second. As part of this saving of data, out of order points are cleared such that, as a function of central storage allocated, total page-in rate is monotonically decreasing for the address space. Similarly, individual out of order Y values are cleared such that, as a function of central storage allocated, productive CPU rate per resident second is monotonically increasing, and total paging costs per resident second is monotonically decreasing. This "clearing" process is done since it is not (in a "well-behaved" case) possible to have increased paging activity for an address space with increasing allocation of central storage. If the plot indicated otherwise, the address space paging characteristics have changed and the adjacent point is said to be "out of order", and is eliminated. Next, 703, the X and Y axes are contracted if necessary. No X axis contracting is needed if the address space's total virtual storage requirement is not contained within the left half of the range or if the address spaces OK1 point is in the right half of the range, or if there are any points that are not in the OK range plotted in the right half of the X axis range. (The OK range of the page-in rate is defined as: a page-in rate that is less than one page-in rate Y axis increment and page-in cost a small (e.g., less than 5%) percentage of productive CPU time.) The X axis range is contracted by halving the amount of storage represented by each increment. The Y axis range is contracted by halving if the range is at least double the largest page-in rate plotted for this address space. Next, 704, points known as OK1, thrash1 (TH1) (or minimum), thrash2 (TH2), for the address space are calculated and saved. If the address has an OK1 point, it is defined as the X axis increment that corresponds to the lowest amount of central storage with an associated page-in rate and page-in cost within the OK range. If the address space has a TH1 point, it is defined as the X axis increment that corresponds to the lowest amount of central storage, where the address spaces page-in rate is above the OK range, and at which the address spaces page-in rate curve becomes "flat". Flat is defined as the page-in rate Y axis values not differing by more than one page-in rate Y axis increment. If the address space has a TH1 point, it will also have a TH2 point—defined as: the X axis increment that corresponds to the highest amount of central storage, where the address spaces page-in rate does not differ from the spaces page-in rate at its TH1 point by more than one page-in rate Y axis increment. The address spaces minimum point is defined as the TH1 point if a TH1 point was found or, if not, as the point in the first half of the plot where the page-in rate is more than double the page-in rate of a later point in the first half of the plot.

Figure 8A:
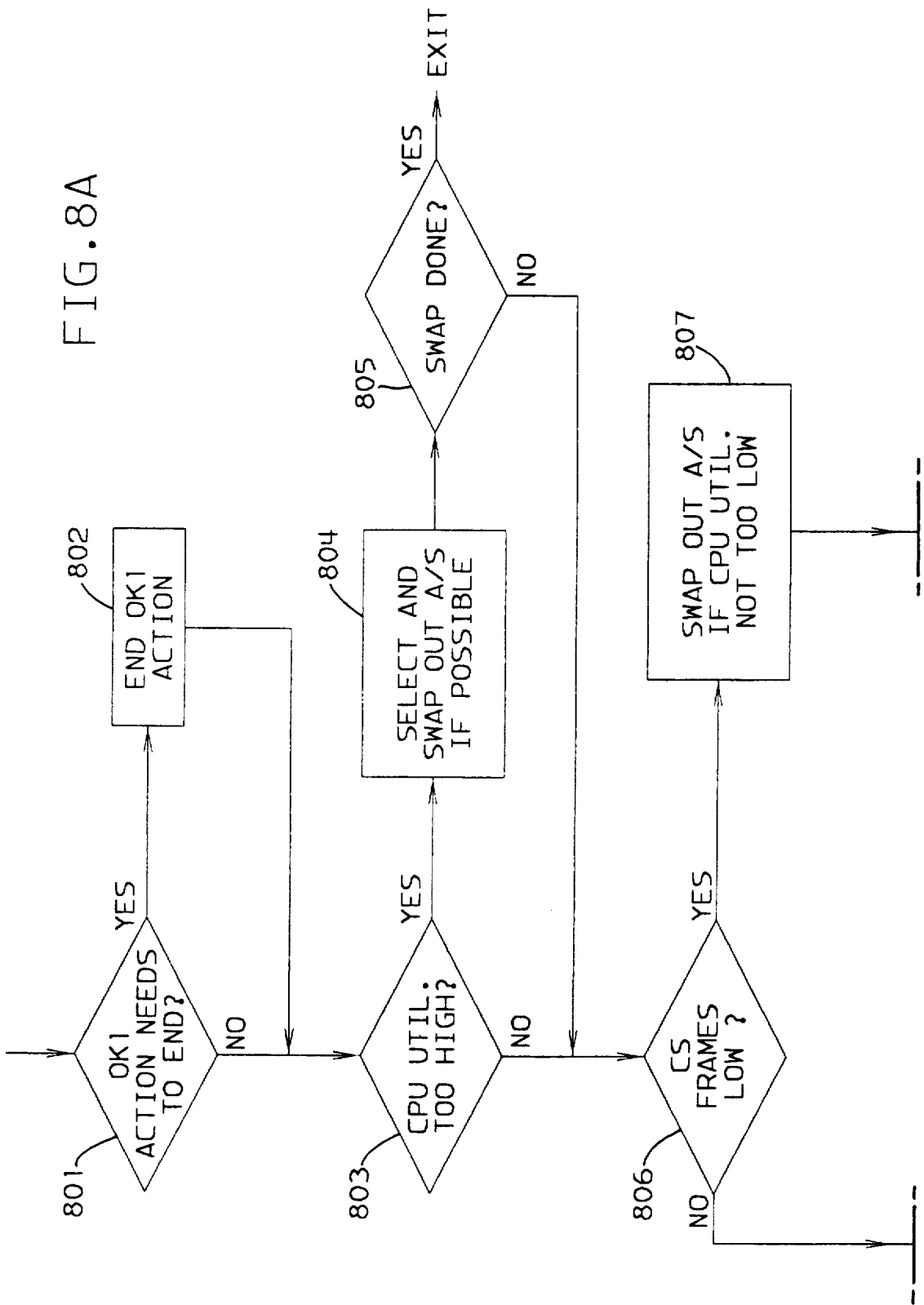
FIGS. 8A and 8B are flowcharts illustrating control flow for Processor and Storage Analysis.
Figure 8B:
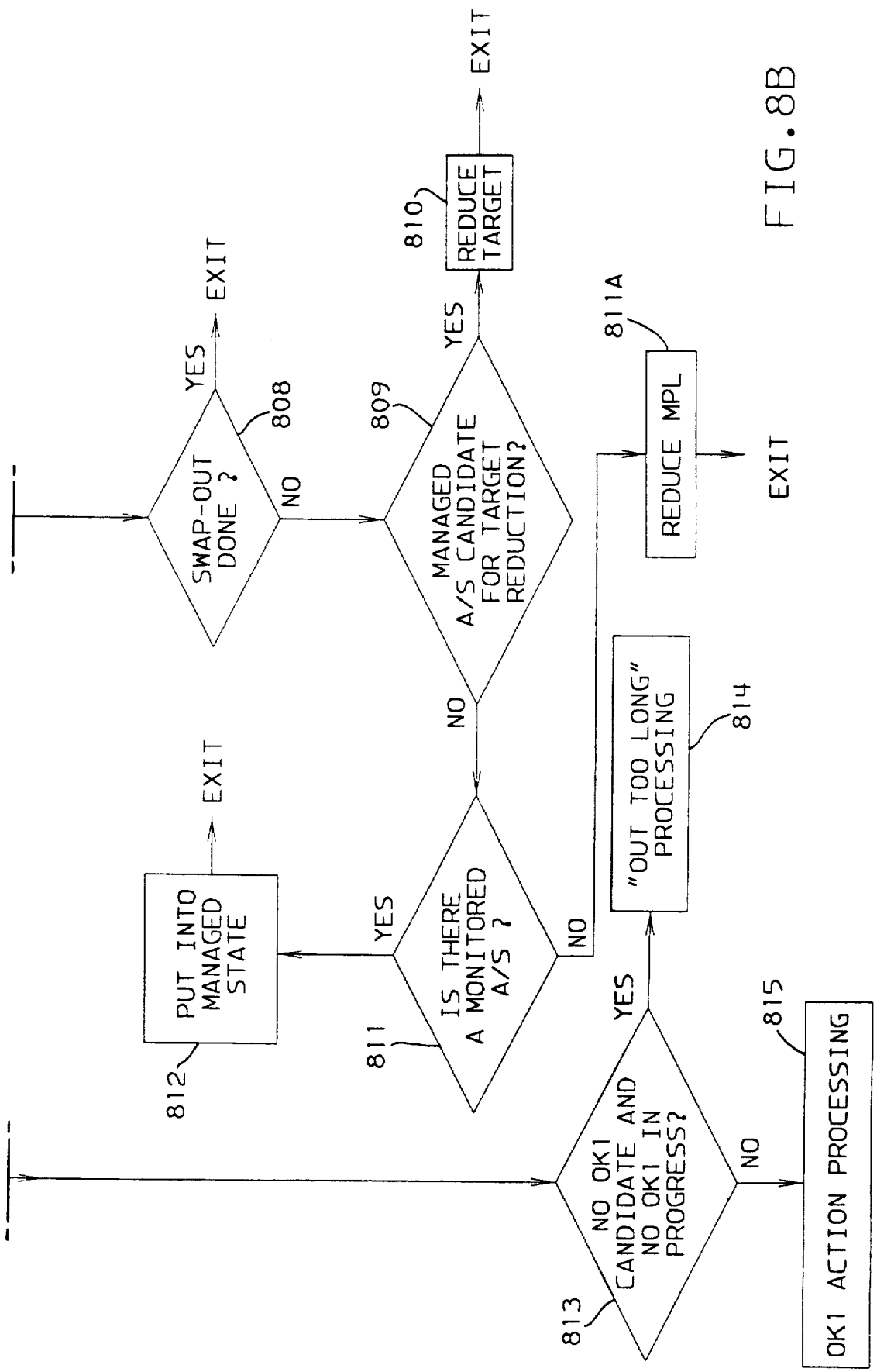

FIG. 8 illustrates control flow for processor and storage analysis. At 801, a test is made whether an OK1 action needs to end for any address space. (There can be only 1 OK action in progress at a time.) An OK1 action needs to ends if there is an OK1 action in progress for an address space and there are no intervals remaining for the action. If this is the case, the OK1 action is ended 802 (by turning off the flag in the Paging Characteristics Block, FIG. 21 at 2105). Next, a test is made whether the CPU utilization is too high 803. If utilization is too high, 804, an address space is swapped-out (if not precluded by installation minimum MPL control). It may be a Monitored or Unmonitored address space. This determination is made based on conventional MVS service rate considerations. If an address space was swapped-out 805, the routine is exited until the next interval. If not, processing continues at 806. A test is made at 806 whether the supply of central storage frames is low. The supply of central storage frames is said to be low if the overage maximum unreferenced interval count of central storage (conventional in MVS) is less than a threshold (e.g., 2 seconds) and the available frame count is also less than a threshold (e.g., 300 frames). If the supply is low, an address space is swapped-out if the CPU utilization is not also low. As previously, the address space may be either an Monitored or Unmonitored address space, and it is selected based on conventional considerations. If a swap-out was done 808, the routine is exited until the next interval. If not, a test is made at 809 whether there is a Managed address space candidate for target reduction. An address space is considered a candidate to have its target reduced if it is Monitored, it does not have target intervals remaining, the target has taken effect (e.g., current central storage frame count is less than or equal to the target frame count), and the target is above the address spaces minimum central storage allocation. If there such as routine is exited until the next interval. If there is no candidate for target reduction, a test is made 811 whether there is a Monitored address space. If there is a Monitored address space, it is put into the Managed state 812, and the routine is exited. The address space is put into the Managed state by assigning a central storage target to it (set initially, e.g., at current allocation minus one X axis increment). If there was no Monitored address space, the MPL is reduced 811A, and the routine is exited. If the supply of central storage frames was not low, a test is made 813 if there is no OK1 candidate. If this is the case, out-too-long processing 814 is invoked. This processing is described in detail in FIG. 10 and the supporting text. If the test at 813 resulted in a no answer, OK1 action processing 815 is invoked. This processing is described in greater detail in FIG. 9 and its supporting text.

Figure 9:
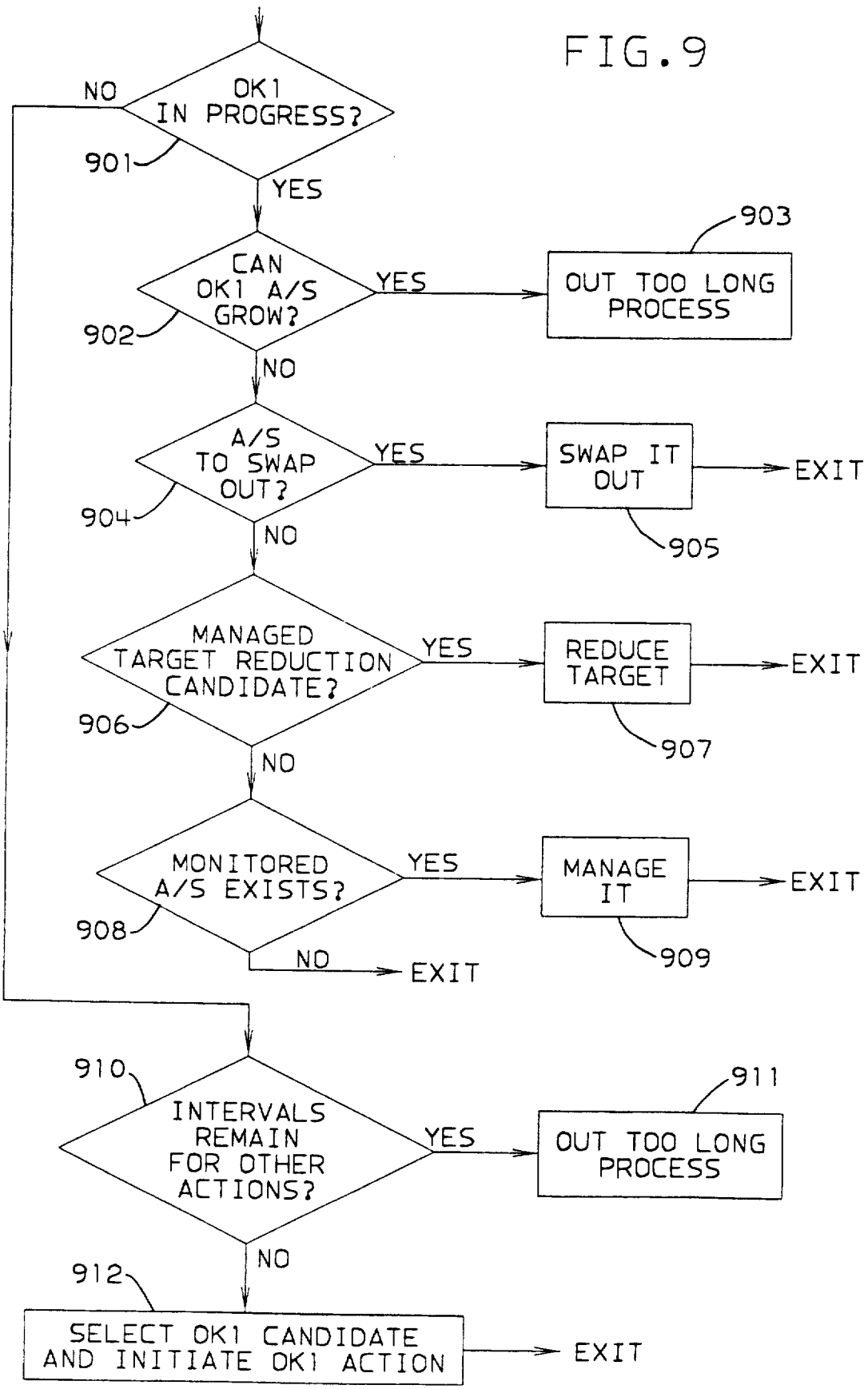
FIG. 9 is a flowchart illustrating control flow for OK1 Action Processing.

FIG. 9 illustrates control flow for OK1 action processing. First, 901, a test is made whether there is an OK1 action in progress. If there is, a test is made 902 whether the OK1 address space can grow. This means that the OK1 address space—the address space with an OK1 action in progress—has increased its central storage allocation in the last interval, and will be able to continue to grow at the same rate without help (based on observed available frame counts). If so, out-too-long processing is invoked 903. (See FIG. 10.) If not, a test is made 904 whether there is an address space to swap-out. (There is one to swap-out if there are more swapped-in than the installation defined minimum MPL (conventional in MVS)). If there is another address space that can be swapped-out, it is selected and swapped-out to make more room for the OK1 action in progress address space 905. The routine is then exited. If there is no address space to swap-out, a test is made 906 whether there is a Managed target reduction candidate. If so, 907, the target is reduced by one X axis increment to make room for the OK1 action in progress address space. An address space is considered a candidate to have its target reduced if it is Monitored, it does not have target intervals remaining, the target has taken effect, and the target is above the address spaces minimum central storage allocation. After this reduction, the routine is exited. If there is no Managed target reduction candidate, a test is made 908 whether a Monitored address space exists. If not, the routine is exited. If so, the address space is put into the Managed state 909 by assigning a central storage target to it (as above). The routine is then exited. Following a no answer to the test at 901, a test is made whether intervals remain for the OK1 candidate for other actions. If so, out-too-long processing is invoked 911. (See FIG. 10.) If not, 912, an OK1 candidate is selected and an OK1 action is initiated for it. The OK1 action is initiated by releasing the address space target, if it has one, and setting the number of intervals to pursue the OK1 action and described previously. The routine is then exited.

Figure 10:
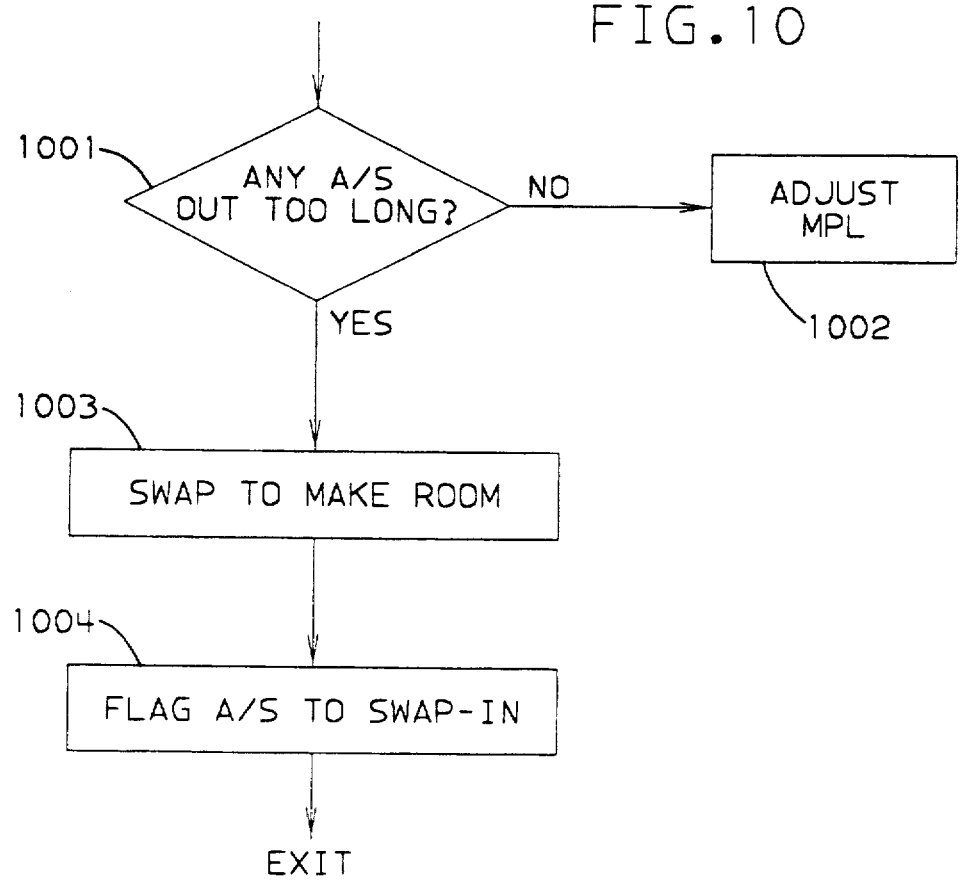
FIG. 10 is a flowchart illustrating control flow for Out-Too-Long Processing.

FIG. 10 illustrates flow control for out-too-long processing. At 1001, a test is made whether any address space has been kept out-too-long. This would have been because another mix of address spaces would result in more productive utilization. If there was an address space which was out-too-long, room is made for this address space by swapping other address spaces out 1003. Address spaces may be swapped-out based on conventional criteria. The installation defined minimum MPL (conventional) will be honored. The out-too-long address space is then flagged to be swapped-in on the next invocation of swap-in evaluation. (See FIG. 5 for further details of this processing.) The routine is then exited. If no address space was out-too-long, adjust multiprogramming level processing is invoked 1002. This processing is described in FIG. 11 and the supporting text below.

Figure 11:
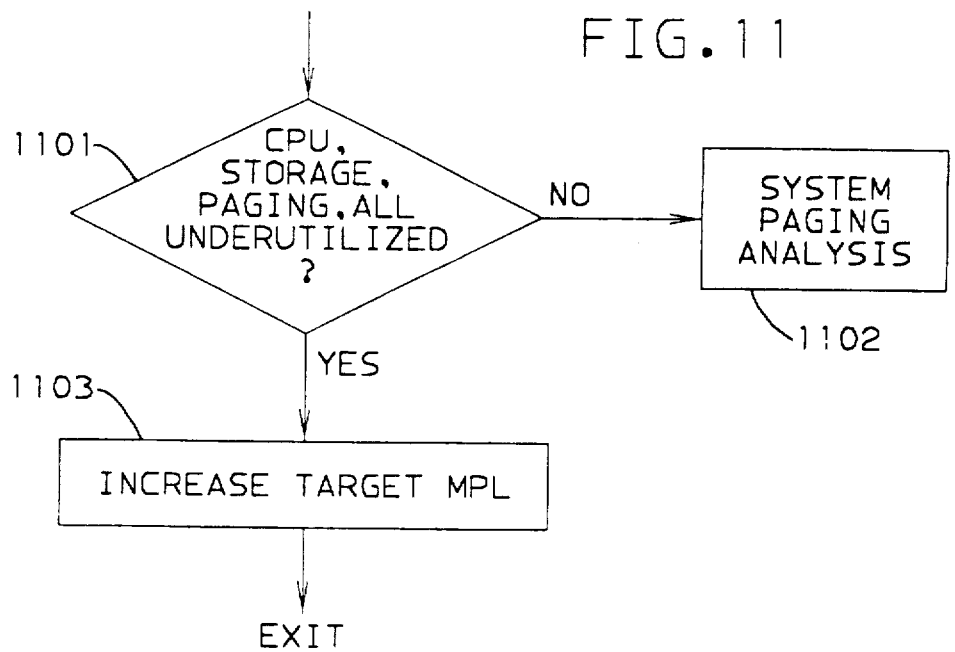
FIG. 11 is a flowchart illustrating control flow for Adjust MPL processing.

FIG. 11 illustrates control flow for adjust multiprogramming level processing. At 1101, a (conventional) test is made whether CPU, storage and system paging are all underutilized. If this is the case, the (conventional) target multiprogramming level is increased by one (if there is ready work), and the routine is exited. If these resources are not all underutilized, system paging analysis is invoked 1102. System paging analysis is described in more detail in FIG. 12 and the supporting text below.

Figure 12:
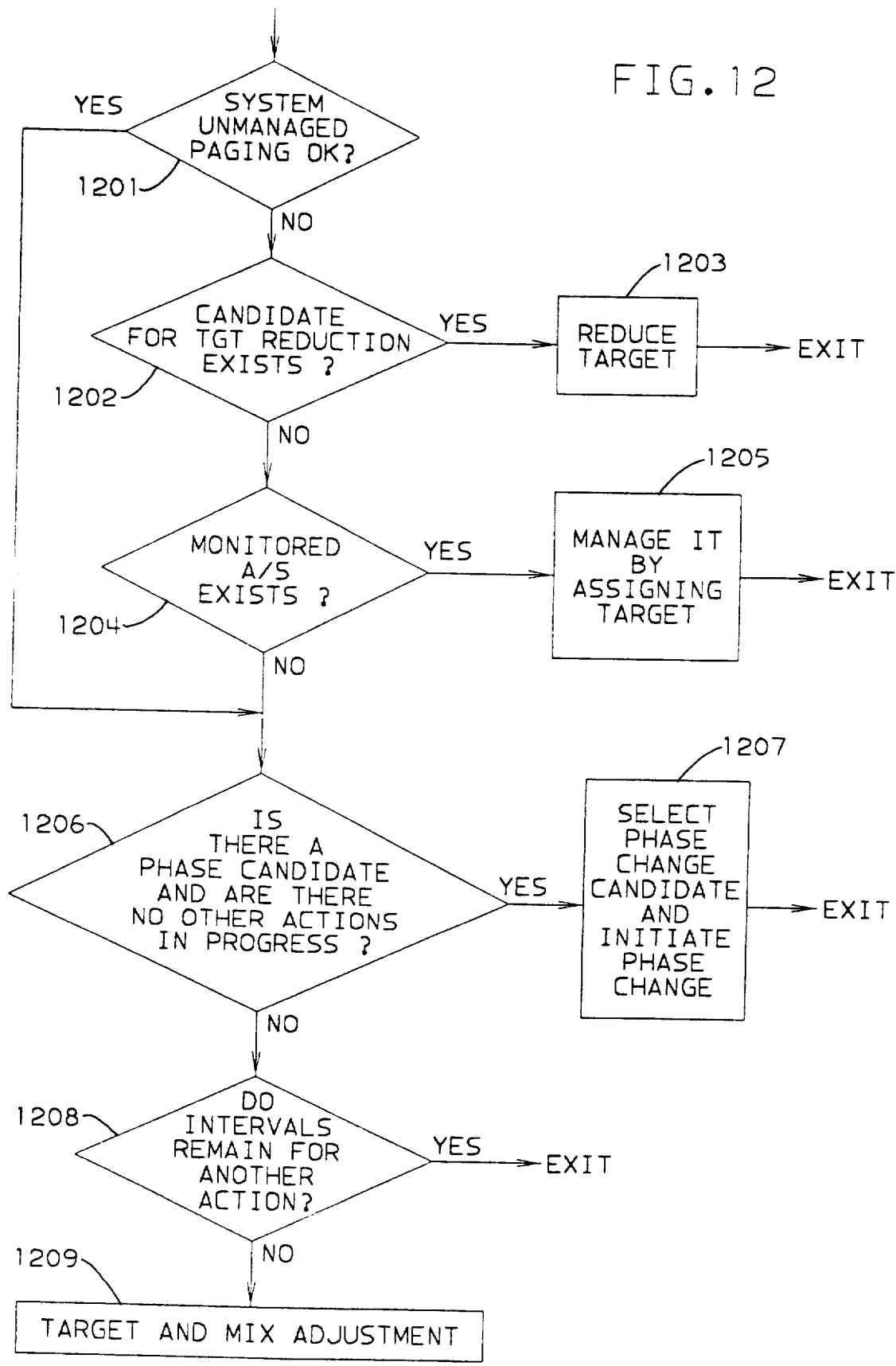
FIG. 12 is a flowchart illustrating control flow for System Paging Analysis.

FIG. 12 describes control flow for system paging analysis. At 1201, a test is made whether system unmanaged paging is at an acceptable level (e.g., 5% of available processor time). If not, 1202, a test is made whether a candidate for target reduction exists. An address space is considered a candidate to have its target reduced if it is Monitored, it does not have target intervals remaining, the target has taken effect, and the target is above the address spaces minimum central storage allocation. If such a candidate exits, its target is reduced by one X axis increment 1203, and the routine is exited. If no candidate existed, a test is made 1204 whether a Monitored address space exists. If so, 1205, the address space is placed into the Managed state by assigning a target to it (as above). The routine is then exited. If no Monitored address space existed (or the test at 1201 resulted in a yes answer) a test is made 1206 if there is a phase change candidate, (see the description of a phase change above) or there are no intervals left on other actions. An address space is a phase change candidate if it has been managed for some interval of time (e.g., 3 minutes initially). If so, 1207, a phase change candidate is selected, and the phase change action is initiated by changing the address space from the Managed state to the Monitored state by clearing the address spaces target. The number of real time and captured time intervals to pursue this action is set, and the phase change action time duration multiplier is incremented by one. The routine is then exited. If the test at 1206 had a negative result, a test is made 1208 whether intervals remain for another action. If so, the routine is exited until the next interval. If not, target and mix adjustment processing is invoked 1209. This processing is described in greater detail below in FIG. 13 and its supporting text.

Figure 13A:
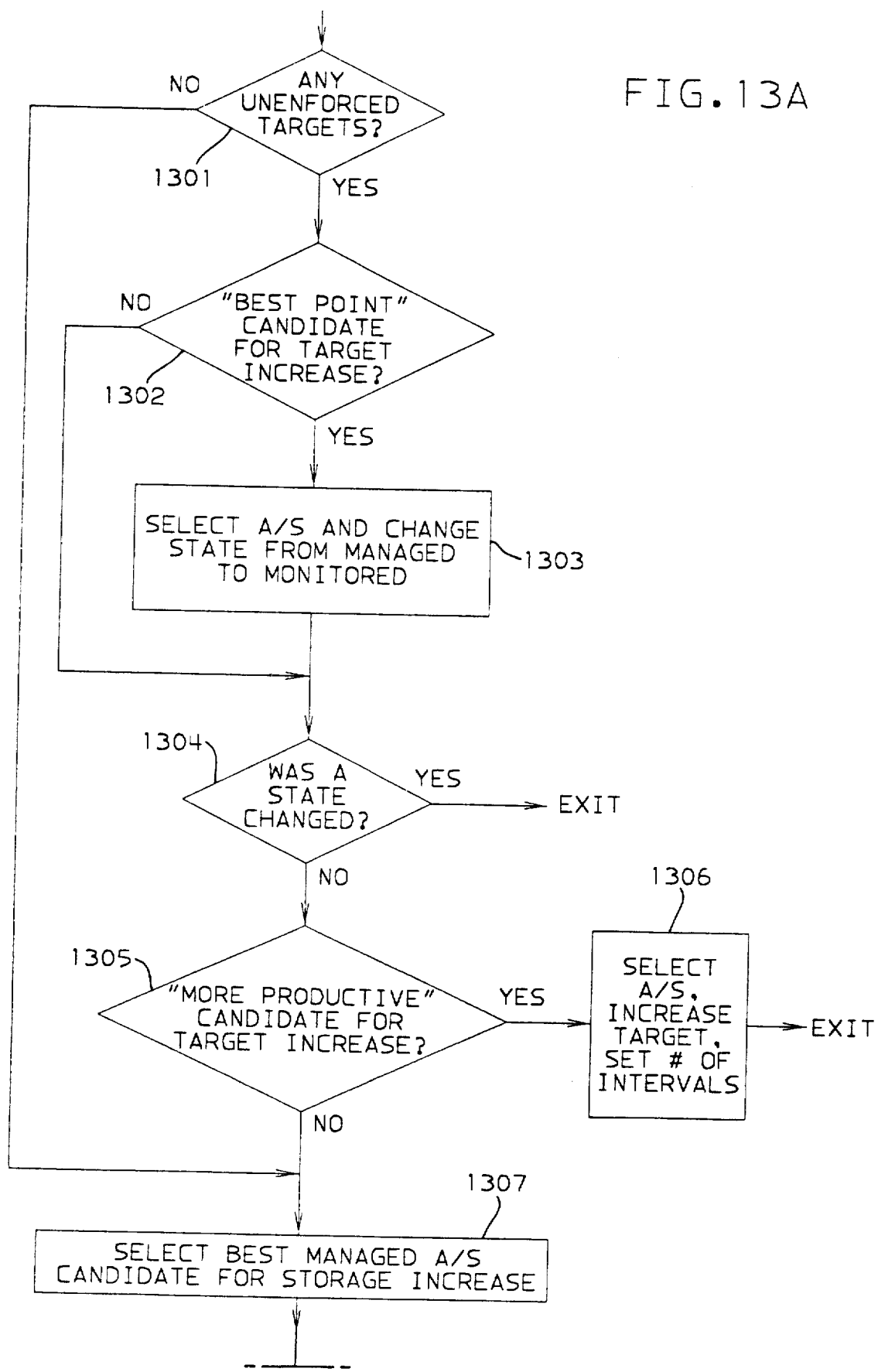
FIGS. 13A and 13B are flowcharts illustrating control flow for Target and Mix Adjustment.
Figure 13B:
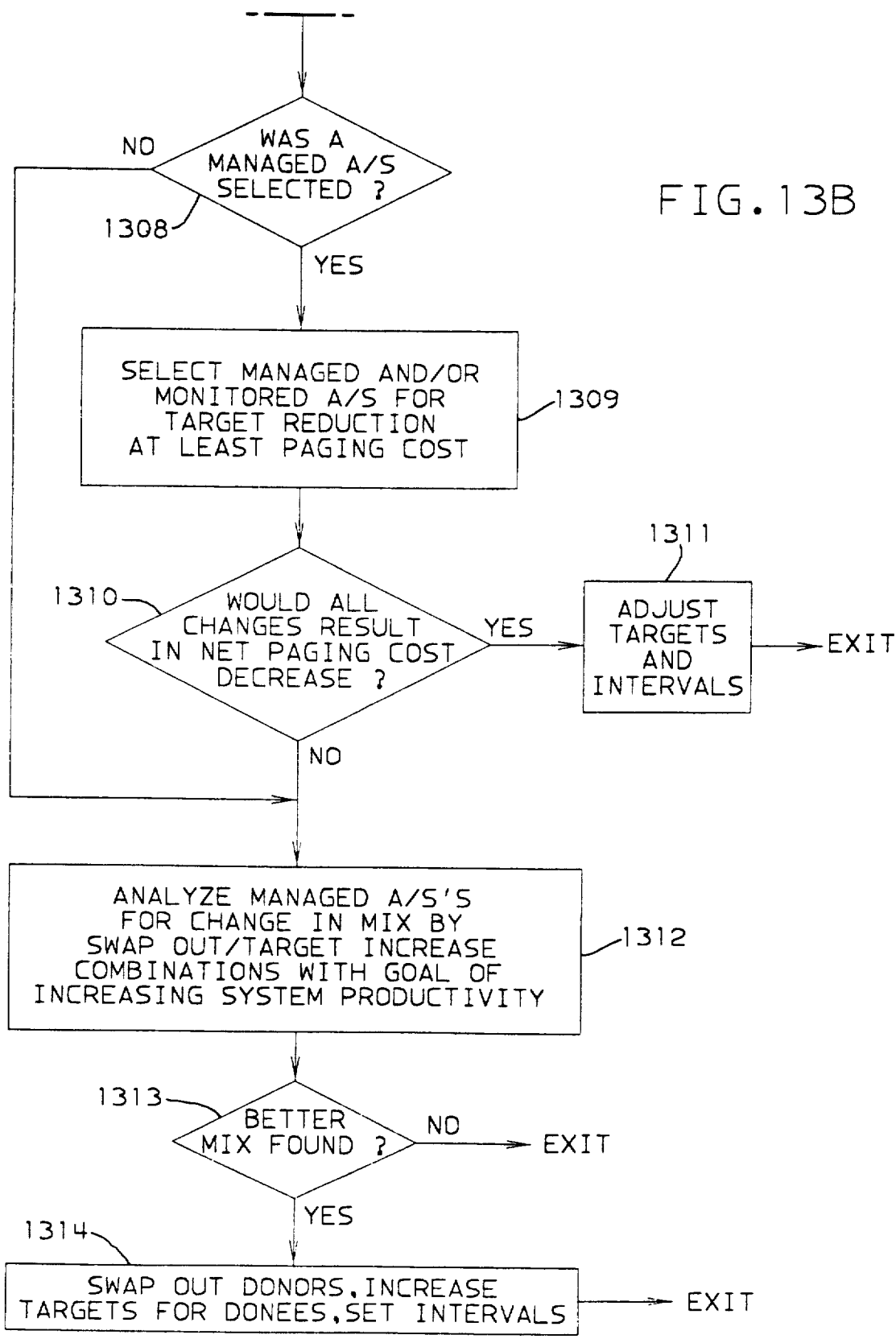

FIG. 13 illustrates control flow for target and mix adjustment. At 1301, a test is made whether there are any unenforced targets for any address space. An address space is said to have an unenforced target if it has more central storage frames than the number specified by the target. In other words, if it has more frames than the target, the target is not being enforced. If there are unenforced targets, a test is made 1302 whether there is a candidate for target release. An address space is such a candidate if it is a Managed address space that could run at its OK1 (or total virtual requirement) (the "best point") if its target were increased by the sum of the unenforced targets. If there are more than one such candidate, the most productive such candidate is selected. The most productive address space is the address space that will have the highest productive CPU rate at its best point. The productive CPU rate is determined by finding the best point and then interpolating the productive CPU rate off the address space plot. If there is such a candidate, that address space is selected 1303, it is changed from the Managed state to the Monitored state by clearing the address spaces target, and the number of intervals to pursue this action is set. Any extra donor address space frames that are not required by the receiver are reallocated to the managed address space that is running closest to its OK1 point. Next, (or following a no result from the test at 1302) a test is made 1304 whether an address space had its state changed from Managed to Monitored. If so, the routine is exited until the next interval. If not, a test is made 1305 whether there is at least one Managed address space that could run more productively if its target were increased by the sum of the unenforced targets. If there is such an address space, it is selected 1306, its target is increased by the sum of the unenforced targets, and the number of intervals to be pursue this action is set. The routine is then exited until the next interval. If there is no such candidate (or following a no result from the test at 1301) the best Managed address space candidate for a storage increase is selected 1307. This is accomplished by analyzing in turn each Managed address space to select the address space that would reduce its paging cost rate the most if it were allocated additional central storage. The amount of additional central storage is either one X axis increment beyond the address spaces TH2 point if the address space is running in its flat range, or one X axis increment beyond the point where it is currently running. A test is made 1308 whether such Managed address space could be selected. If one was selected, each Managed or Monitored address space, except the address space selected for the central storage increase at 1307, is analyzed 1309 to determine how much it would increase its paging cost rate if its central storage allocation were to be reduced by one X axis increment. The address space that would increase its paging cost rate the least is selected. This process is continued until enough central storage has been accumulated from such selected Managed and/or Monitored address spaces to make up for the projected storage increase determined at step 1307. Next, 1310, a test is made whether all the changes projected as a result of steps 1307 and 1308 would result in a net paging cost decrease to the system (see formula #1 in introduction). If there would be such a net paging cost decrease, the targets of the donor address spaces are decreased, the target of the donor address space is increased, and the number of intervals to pursue this action is set (e.g., 10 intervals) 1311. The routine is then exited until the next interval. If the changes would not result in a net paging cost decrease (or following a no result from the test at 1308) a mix change assessment is made 1312 by analyzing Managed address spaces to see whether swap-out/-target increase combinations can be performed to increase system productivity. This assessment is performed by analyzing each Managed address space in turn, in order of most productive to least productive to determine if increasing its target by the sum of central storage allocated to potential donor address spaces and swapping-out the donor address spaces would result in the total system running more productively (see formula #2 in introduction). Donors are selected from among all Managed address spaces in order of least productive to most productive. (One donee and one or more donors is considered ) A test is then made 1313 whether a better potential mix was found by the processing at 1312. If not, the routine is exited. If so, the donors are swapped-out, the target of the donee address spaces are released by changing the address space from the Managed state to the Monitored state by clearing the address space central storage target, and the number of intervals to pursue this action is set (e.g., 20 intervals). The routine is then exited.

Any extra donor address space frames that are not required by the receiver are reallocated to the managed address space that is running closest to its OK1 point.

Although specific embodiments of the invention have been disclosed, it will be understood by those having skill in the art that changes can be made to these specific embodiments (e.g., extensions from managing central storage, to managing both central and expanded storage) without departing from the spirit and scope of the invention.

What is claimed is:

1. In a virtual storage programming system comprising a CPU, processor storage, programs in address spaces, and an operating system, a method for determining and using program paging characteristics to improve productive CPU time comprising the steps of:
   a) said operating system selecting one or more to-be-monitored programs;
   b) said operating system periodically collecting paging data for said one or more to-be-monitored programs;
   c) said operating system individually managing a working set of a selected program of said one or more to-be-monitored programs to collect additional paging data for said selected program;
   d) said operating system performing a working set target adjustment and program mix adjustment function based on a projected improvement in said productive CPU time using said paging data and said additional paging data.

2. The method of claim 1 in which said step of individually managing comprises protecting said selected program from page replacement to attempt to allow the working set of said selected program to grow to a larger value than current working set size.

3. The method of claim 2 in which said larger value is an OK1 point.

4. The method of claim 1 in which said step of individually managing comprises reducing the working set of said selected program to attempt to shrink the working set of said selected program to a smaller value than current working set size.

5. The method of claim 4 in which said smaller value is a TH1 point.

6. In a programming system comprising a CPU, processor storage, programs in address spaces, and an operating system, a method for determining and using program paging characteristics to improve productive CPU time comprising the steps of said operating system collecting in a control block system paging data comprising the system's CPU cost for unmanaged paging and swapping per processor elapsed second as a function of idle frame sections and said operating system using said system paging data to determine an address space swap comprising a donor address space of said address spaces to swap out and a receiver address space of said address spaces to swap in, said address space swap resulting in a projected improvement in said productive CPU time according to said system paging data.

7. In a programming system comprising a CPU, processor storage, programs in address spaces, and an operating system, a method for determining and using program paging characteristics to improve productive CPU time comprising the steps of said operating system collecting in a control block first system paging data comprising the system's productive CPU rate per processor elapsed second as a function of idle frame sections and said operating system using said system paging data to determine an address space swap comprising a donor address space of said address spaces to swap out and a receiver address space of said address spaces to swap in, said address space swap resulting in a projected improvement in said productive CPU time according to said system paging data.

8. The method of claim 7 further comprising the step of said operating system collecting in a control block second system paging data comprising the system's CPU cost for unmanaged paging and swapping per processor elapsed second as a function of idle frame seconds.

9. In a programming system comprising a CPU, processor storage, programs in address spaces, and an operating system, a method for determining and using program paging characteristics to improve productive CPU time comprising the steps of said operating system collecting, in a program-related control block, program paging data comprising the program's CPU cost for paging per resident second as a function of central storage allocated and said operating system using said system paging data to determine an address space swap comprising a donor address space of said address spaces to swap out and a receiver address space of said address spaces to swap in, said address space swap resulting in a projected improvement in said productive CPU time according to said system paging data.

10. In a programming system comprising a CPU, processor storage, programs in address spaces, and an operating system, a method for determining and using program paging characteristics to improve productive CPU time comprising the steps of said operating system collecting, in a program-related control block, program paging data comprising the program's productive CPU rate per resident second as a function of central storage allocated and said operating system using said system paging data to determine an address space swap comprising a donor address space of said address spaces to swap out and a receiver address space of said address spaces to swap in, said address space swap resulting in a projected improvement in said productive CPU time according to said system paging data.

11. The method of claim 10 further comprising the step of said operating system collecting, in a program-related control block, program paging data comprising the program's CPU cost for paging per resident second as a function of central storage allocated.

12. In a multiprogramming system comprising a CPU, processor storage, programs in address spaces, and an operating system, a method for determining and using program paging characteristics to improve productive CPU time comprising the steps of:
 a) said operating system selecting one or more to-be-monitored programs;
 b) said operating system generating a set of paging characteristics for each to-be-monitored program over a time interval;
 c) said operating system selecting one or more to-be-managed programs from the one or more to-be-monitored programs;
 d) said operating system assigning a target working set size to be one or more to-be-managed programs;
 e) said operating system using said set of paging characteristics to estimate whether making working set-related program adjustments on said one or more to-be-managed programs will improve projected productive system utilization;
 f) said operating system initiating said working set-related program adjustments for said one or more to-be-managed programs if said step of estimating determines that making said adjustments will improve projected productive system utilization.

13. The method of claim 10 in which all of said steps are performed only after said operating system first computes system paging activity and determines said paging activity to be above a threshold.

14. The method of claim 12 or claim 13 in which said working set-related adjustments comprise adjusting working set sizes.

15. The method of claim 14 in which said adjustments are done by determining a value of reallocating a number of frames from one or more donor programs to a receiver program.

16. The method of claim 15 in which said value is computed by subtracting from the receiver program's projected paging cost rate at a potential new working set size less its current paging cost rate, a total projected paging cost for all potential donor programs at their potential new working set sizes less their current paging costs.

17. The method of claim 12 or claim 13 in which said working set-related adjustments comprise adjusting a mix of active programs.

18. The method of claim 17 in which said adjustments are done by initiating swap-out and target increase actions based on an estimated change value.

19. The method of claim 18 in which said estimated change value computes benefit to system productivity of swapping out one or more donor programs and making their frames available to a receiver program.

20. The method of claim 19 in which said estimated change value is computed by performing the following computational steps:
 a) adding the receiver program's projected productive CPU rate at OK1 less its current productive CPU rate;
 b) subtracting the receiver program's projected paging cost rate at OK1 less its paging cost rate;
 c) subtracting a total current productive CPU rate attributed to all potential donor programs;
 d) adding a total current paging cost attributed to all potential donor programs:
 e) subtracting a system productive CPU rate at SC less a rate at SP;
 f) subtracting a system unmanaged paging and swap cost rate at SC less a rate at SP.

21. In a virtual storage programming system comprising a CPU, processor storage, programs in address spaces, and an operating system, an apparatus for determining and using program paging characteristics to improve productive CPU time comprising:
 a) paging data collection means comprising system paging data collection means for collecting system paging data, and address space data collection means for collecting address space paging data for monitored address spaces;
 b) target setting means for selecting one or more managed address spaces from said monitored address spaces, and assigning working set storage targets to each of said one or more managed programs when said system paging data indicates a high level of unmanaged paging;
 c) target and mix adjustment means for making one or more working set changes based on a projected improvement in said productive CPU time using said address space paging data.

22. The apparatus of claim 21 in which said one or more working changes comprise changing said working set storage targets.

23. The apparatus of claim 22 in which said one or more working changes comprise swapping at least one of said address spaces out and swapping at least one of said address spaces in.

* * * * *